US011536870B2

(12) United States Patent
Yang et al.

(10) Patent No.: US 11,536,870 B2
(45) Date of Patent: Dec. 27, 2022

(54) DOWNHOLE ADAPTIVE DATA COMPRESSION AND FORMATTING

(71) Applicant: Halliburton Energy Services, Inc., Houston, TX (US)

(72) Inventors: Jie Yang, Houston, TX (US); Rebecca Corina Jachmann, Spring, TX (US); You Wang, Austin, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/691,066

(22) Filed: Nov. 21, 2019

(65) Prior Publication Data

US 2021/0157026 A1 May 27, 2021

(51) Int. Cl.
*G01V 3/32* (2006.01)
*G01V 3/38* (2006.01)
*G01V 3/34* (2006.01)

(52) U.S. Cl.
CPC .............. *G01V 3/32* (2013.01); *G01V 3/34* (2013.01); *G01V 3/38* (2013.01)

(58) Field of Classification Search
CPC ... G01V 3/32; G01V 3/34; G01V 3/38; G01V 11/002; E21B 47/0025; E21B 47/024; E21B 47/20; E21B 49/00; G06T 9/00; G06T 9/004; H04N 19/103; H04N 19/593
USPC .................................................. 324/300–375
See application file for complete search history.

(56) References Cited

U.S. PATENT DOCUMENTS

| | | | | |
|---|---|---|---|---|
| 4,012,712 A | * | 3/1977 | Nelligan | G01V 11/002 |
| | | | | 181/102 |
| 4,233,684 A | | 11/1980 | Eggermont | |
| 4,736,300 A | * | 4/1988 | Johnson, Jr. | G01V 3/38 |
| | | | | 324/366 |
| 5,504,479 A | * | 4/1996 | Doyle | H04L 25/4921 |
| | | | | 340/854.9 |
| 5,703,907 A | * | 12/1997 | James | G06T 9/005 |
| | | | | 375/240 |

(Continued)

FOREIGN PATENT DOCUMENTS

WO  WO-2018160176 A1 * 9/2018 ......... E21B 47/0025

OTHER PUBLICATIONS

PCT Application Serial No. PCT/US2019/062674, International Search Report, dated Mar. 5, 2020, 4 pages.

(Continued)

*Primary Examiner* — Patrick Assouad
*Assistant Examiner* — Sean Curtis
(74) *Attorney, Agent, or Firm* — Delizio, Peacock, Lewin & Guerra

(57) ABSTRACT

Data is received downhole from a downhole logging tool to produce received data. The received data is processed to produce processed data. A binary formatting option is selected from a group of binary formatting options, wherein applying the selected binary formatting option to the processed data produces fewer bits than applying any other binary formatting option of the group of binary formatting options to the processed data. The selected binary formatting option is applied to the processed data to produce binary data. The binary data is transmitted uphole. The binary data is received uphole. The received binary data is decompressed to produce uncompressed data. The uncompressed data is processed uphole.

20 Claims, 22 Drawing Sheets

(56) References Cited

U.S. PATENT DOCUMENTS

| | | | |
|---|---|---|---|
| 6,405,136 B1* | 6/2002 | Li | H03M 7/30 |
| | | | 702/9 |
| 6,816,787 B2* | 11/2004 | Ramamoorthy | G01V 11/00 |
| | | | 702/7 |
| 7,015,694 B2* | 3/2006 | Blumich | G01V 3/32 |
| | | | 324/303 |
| 7,283,910 B2* | 10/2007 | Hassan | G01V 11/00 |
| | | | 702/6 |
| 7,787,525 B1* | 8/2010 | Clark, Jr. | E21B 47/13 |
| | | | 702/6 |
| 7,821,260 B2* | 10/2010 | Hamdan | G01N 24/081 |
| | | | 324/303 |
| 8,024,121 B2* | 9/2011 | Tang | G01V 1/22 |
| | | | 702/6 |
| 9,625,603 B2* | 4/2017 | Stolpman | G01V 3/34 |
| 9,778,389 B2* | 10/2017 | Stolpman | H04B 13/02 |
| 9,784,097 B2* | 10/2017 | Dugas | E21B 47/18 |
| 9,866,835 B2* | 1/2018 | Gelman | H04N 19/85 |
| 9,923,575 B2* | 3/2018 | Yang | H03M 7/40 |
| 9,932,824 B2* | 4/2018 | Yu | E21B 47/135 |
| 10,274,639 B2* | 4/2019 | Gelman | G01V 11/002 |
| 10,378,342 B2* | 8/2019 | Barak | E21B 34/06 |
| 10,459,109 B2* | 10/2019 | Fan | G01V 3/28 |
| 11,016,219 B2* | 5/2021 | Marsh | E21B 47/024 |
| 11,060,398 B2* | 7/2021 | Butler | E21B 47/13 |
| 11,105,948 B2* | 8/2021 | Hu | G01N 24/081 |
| 2004/0032258 A1* | 2/2004 | Blumich | G01V 3/32 |
| | | | 324/303 |
| 2004/0204857 A1* | 10/2004 | Ramamoorthy | G01V 11/00 |
| | | | 702/7 |
| 2005/0222775 A1* | 10/2005 | Kisra | G01V 3/34 |
| | | | 702/14 |
| 2006/0015257 A1* | 1/2006 | Hassan | E21B 47/02 |
| | | | 702/6 |
| 2009/0192711 A1* | 7/2009 | Tang | E21B 47/12 |
| | | | 702/6 |
| 2013/0093597 A1* | 4/2013 | Stolpman | H04L 25/03866 |
| | | | 340/854.3 |
| 2014/0229113 A1* | 8/2014 | Yang | G01V 11/002 |
| | | | 708/203 |
| 2015/0107903 A1* | 4/2015 | Sugiura | E21B 47/12 |
| | | | 175/45 |
| 2015/0381981 A1* | 12/2015 | Gelman | H04N 19/63 |
| | | | 382/109 |
| 2016/0018555 A1* | 1/2016 | Jachmann | G01V 3/32 |
| | | | 324/303 |
| 2016/0245078 A1* | 8/2016 | Mahmoud | E21B 47/20 |
| 2016/0290128 A1* | 10/2016 | Dugas | E21B 47/18 |
| 2017/0114634 A1* | 4/2017 | Yu | E21B 47/113 |
| 2017/0306755 A1* | 10/2017 | Barak | E21B 34/06 |
| 2018/0003043 A1* | 1/2018 | Gelman | E21B 47/125 |
| 2018/0246246 A1* | 8/2018 | Fan | G01V 1/50 |
| 2018/0284313 A1* | 10/2018 | Hu | G06F 17/15 |
| 2018/0291713 A1* | 10/2018 | Jeanson | E21B 43/128 |
| 2019/0345816 A1* | 11/2019 | Auchere | E21B 44/02 |
| 2020/0241166 A1* | 7/2020 | Marsh | E21B 47/20 |
| 2020/0392836 A1* | 12/2020 | Mohnke | H04N 19/51 |
| 2021/0019350 A1* | 1/2021 | Dixon | G06Q 10/067 |
| 2021/0062643 A1* | 3/2021 | Butler | G01V 3/34 |
| 2021/0157026 A1* | 5/2021 | Yang | G01V 3/38 |
| 2021/0199838 A1* | 7/2021 | Tang | G01V 3/32 |
| 2022/0035064 A1* | 2/2022 | Alvarez | G01V 1/44 |

OTHER PUBLICATIONS

PCT Application Serial No. PCT/US2019/062674, International Written Opinion, dated Mar. 5, 2020, 6 pages.

* cited by examiner

T1 Uphole Inversion

T1
OR

DOWNHOLE ADAPTIVE DATA COMPRESSION AND FORMATTING

BACKGROUND

The main functionality of logging tools is to take informative measurements that can be interpreted to use for optimal oil and gas production from underground. The Nuclear Magnetic Resonance (NMR) tool is known for its ability to distinguish different pore sizes and fluid content. Some tools are wireline tools. NMR tools may be used in a well that has already been drilled. The tools are lowered into the hole with a large wireline cable. Other NMR tools are measurement while drilling tools. These tools are part of the drill string and measure while the hole is being drilled out. Measurements while drilling are considered the best for NMR since drilling mud has not had time to invade the formation. However, there are many challenges when tools are measuring the formation while on the drill string. This disclosure addresses the data rate challenge.

The rate at which data is sent uphole with telemetry is limited in a drilling environment. The current rate is very slow, typically on the order of 10 bits-per-second (bps) depending on depth, for all the tools on the entire drill string. An NMR tool may be allotted a small portion of the pulsing rate, especially when image data needs to be pulsed up from imaging tools. So, for example, NMR data could be down to about 9 bits in a minute. Continual improvements to telemetry speed are being attempted, but progress is slow. At such a low bandwidth every bit used needs to be carefully considered and used strategically. Compressing data is one way to achieve a smooth-running service.

NMR data is a very useful measurement in that it can give insight into the composition of the fluids or pore size distribution. There are three basic zones into which the NMR spectrum is partitioned, which are referred to as the Macro (sometimes referred to as free fluid), Meso, and Micro zones. Summing all the bins, or the three partitions, gives the total porosity.

In the current service for the Magnetic Resonance Imaging Logging-While Drilling (MRIL®-WD™, where both trademarks are owned by Halliburton) tools, there are two options for sending data uphole. The first is to send the total porosity, free fluid porosity, and micro porosity. These three numbers can then be further used to aid in geosteering the tool. However, they do not reveal the full story of the formation as a full spectrum would.

The second option for sending NMR data is to send the total porosity along with the spectrum. The full spectrum typically has between 30 to 60 bins. However, with the slow rate at which data can be sent uphole, the spectrum is sub-sampled, perhaps down to 12 bins, then sent uphole. Those 12 bins are then resampled to the number of bins reported by the final post job processing output. Having the full spectrum allows for customers to observe multiple peaks within the various partitions, or to set different limits for the partitions actively since not all formations will have the same cut offs.

The full spectrum, even if it is only 12 bins for real-time data, takes more than twice the bits as the three partitions. For example, the values for the three partitions may take 24 bits, while a full 12-bin-spectrum with total porosity can take over 50 bits.

Under the current operating circumstances, this means that the spectrum is not often sent uphole during a run, which means poor resolution.

Other downhole tools, such as resistivity tools, density tools, etc., produce data that is required to be telemetered from a downhole location to an uphole location, such as the earth's surface. The same bandwidth constraints apply to those tools and their data.

Transmitting data from a downhole tool to an uphole location in a bandwidth-restricted environment, such as logging-while-drilling (LWD) or measurement-while-drilling, is a challenge.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation.

Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

Figure 1:
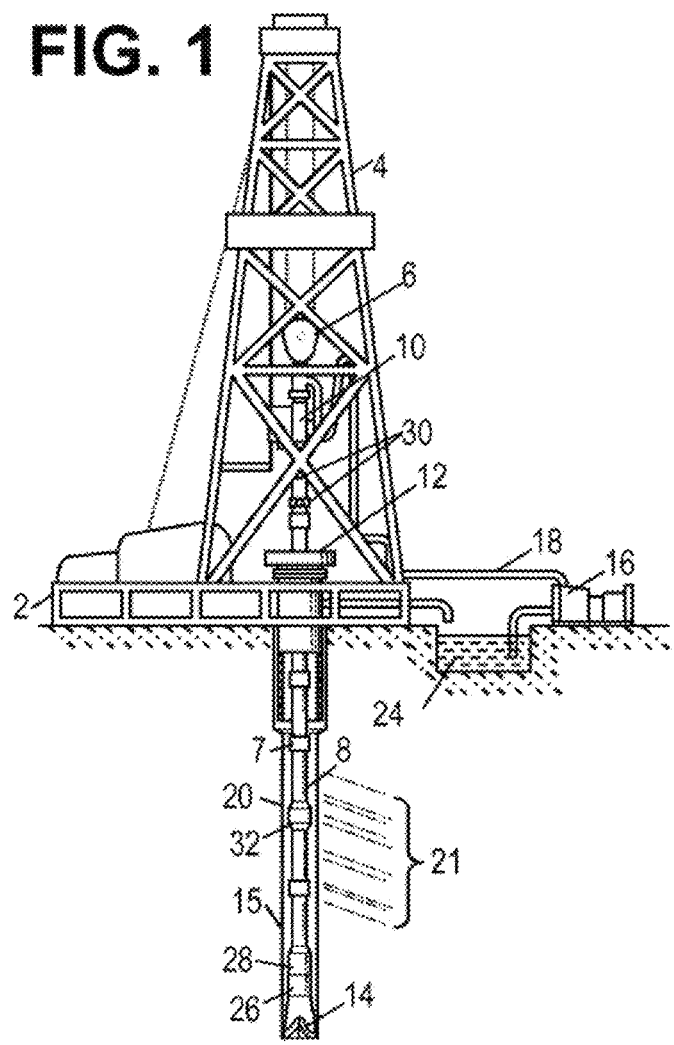
FIG. 1 shows an illustrative logging while drilling (LWD) environment.

FIG. 1 shows an illustrative logging while drilling (LWD) environment. A drilling platform 2 supports a derrick 4 having a traveling block 6 for raising and lowering a drill string 8. A top drive 10 supports and rotates the drill string 8 as the string is lowered through a well head 12. The drill string's rotation (and/or a downhole motor) drives a drill bit 14 to extend the borehole 15 through subsurface earth formations 21. Mud recirculation equipment 16 draws drilling fluid from a retention pit 24 and pumps it through a feed pipe 18 to top drive 10, through the interior of drill string 8 to the drill bit 14, through orifices in the drill bit, through the annulus around drill string 8 to a blowout preventer at the surface, and through a discharge pipe into the pit 24. The drilling fluid transports cuttings from the borehole into the pit 24 and aids in maintaining the borehole integrity.

A nuclear magnetic resonance (NMR) logging tool 26 is integrated into the bottom-hole assembly near the bit 14. The NMR logging tool 26 may take the form of a drill collar, i.e., a thick-walled tubular that provides weight and rigidity to aid the drilling process. As the bit extends the borehole through the formations, the NMR logging tool collects measurements relating to spin relaxation time ($T_1$, $T_2$, $T_p$, and/or $T_2^*$) distributions as a function of depth or position in the borehole. The NMR tool has a magnet, antenna, and supporting electronics. The permanent magnet in the tool causes the nuclear spins to build up into a cohesive magnetization. The $T_2$ is measured through the decay of excited magnetization while $T_1$ is measured by the buildup of magnetization. Other tools and sensors can also be included in the bottomhole assembly to gather measurements of various drilling parameters such as position, orientation, weight-on-bit, borehole diameter, etc. Control/telemetry module 28 collects data from the various bottomhole assembly instruments (including position and orientation information) and stores them in internal memory, which may be able to store hundreds of hours of data. Selected portions of the data (raw or processed) can be communicated to surface receivers 30 by, e.g., mud pulse telemetry. Other logging-while drilling telemetry methods also exist and could be employed. For example, electromagnetic telemetry or through-wall acoustic telemetry can be employed with an optional repeater 32 to extend the telemetry range. Most telemetry systems also enable commands to be communicated from the surface to the control and telemetry module to configure the operation of the tools.

Figure 2:
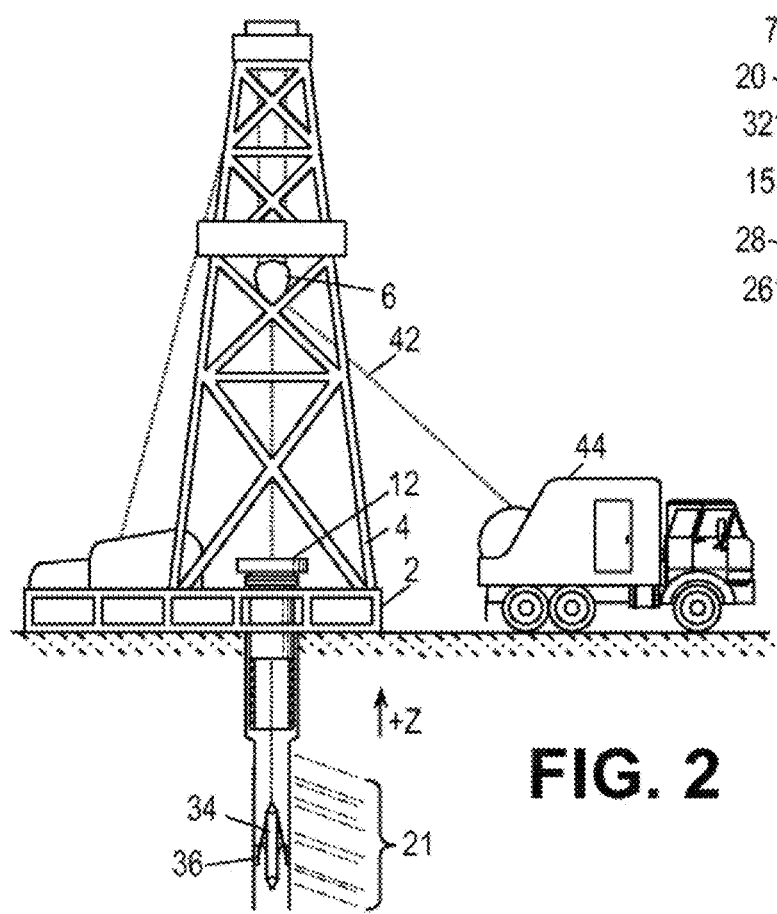
FIG. 2 shows an illustrative wireline logging environment.

FIG. 2 shows an illustrative wireline logging environment. At various times during the drilling process, the drill string 8 may be removed from the borehole as shown in FIG. 2. Once the drill string has been removed, logging operations can be conducted using a wireline logging tool 34, i.e., a sensing instrument sonde suspended by a cable 42 having conductors for transporting power to the tool and telemetry from the tool to the surface. The wireline logging tool 34 may have pads 36 and/or centralizing springs or a decentralizer to maintain the tool in the right position, for example, that could be near the axis of the borehole or against the wall, as the tool is pulled uphole. As explained further below, tool 34 can include an NMR logging instrument that collects relaxation time distribution measurements. A logging facility 44 collects measurements from the logging tool 34 and includes a computer system for processing and storing the measurements gathered by the logging tool.

Figure 3:
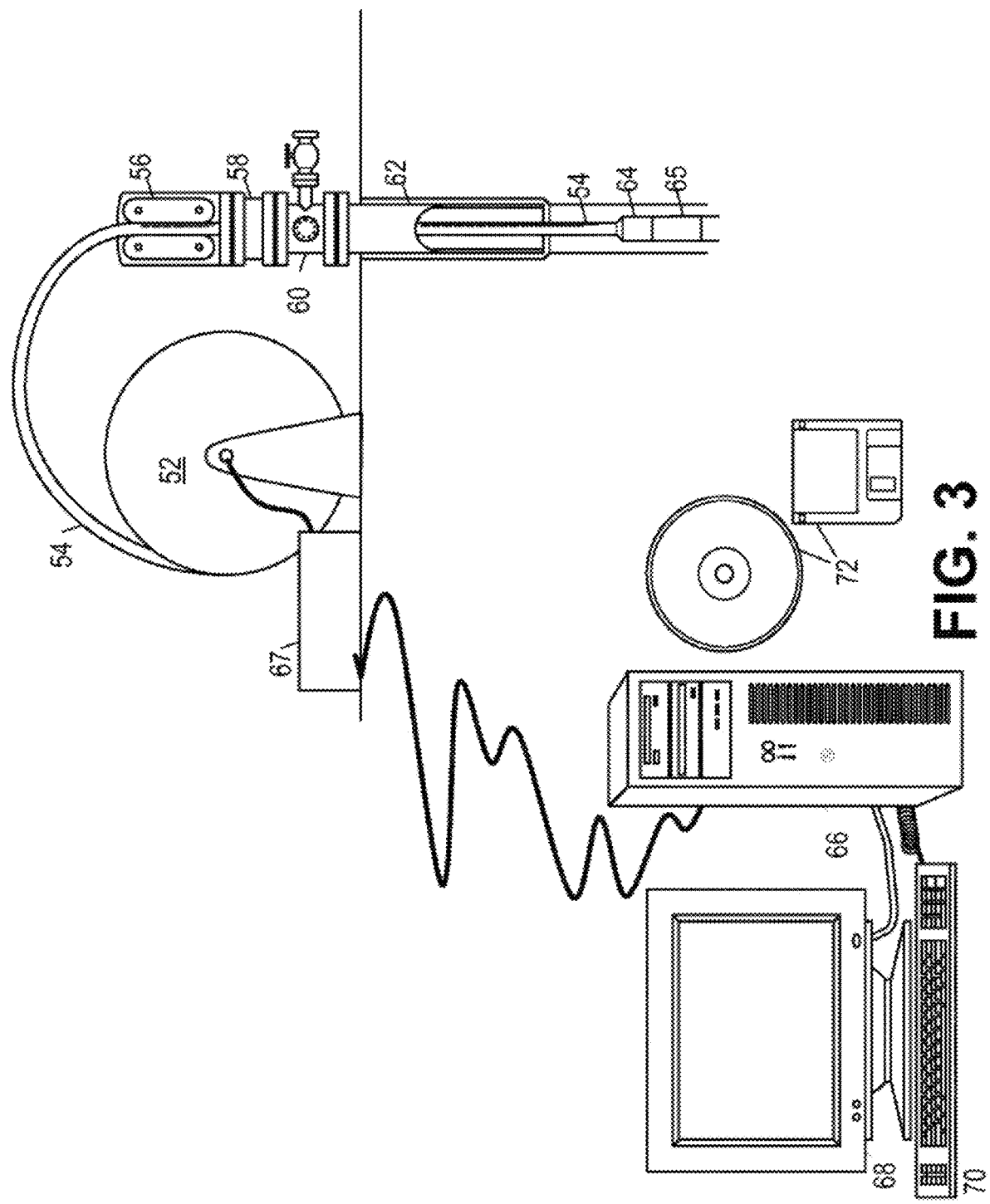
FIG. 3 shows an illustrative coil tubing logging system.

An alternative logging technique is tubing-conveyed logging. FIG. 3 shows an illustrative coil tubing logging system in which coil tubing 54 is pulled from a spool 52 by a tubing injector 56 and injected into a well through a packer 58 and a blowout preventer 60 into the well 62. In the well, a supervisory sub 64 and one or more logging tools 65 are coupled to the coil tubing 54 and configured to communicate to a surface computer system 66 via information conduits or other telemetry channels. An uphole interface 67 may be provided to exchange communications with the supervisory sub and receive data, to be conveyed to the surface computer system 66.

Surface computer system 66 is configured to communicate with supervisory sub 64 to set logging parameters and collect logging information from the one or more logging tools 65 such as an NMR logging tool. Surface computer system 66 is preferably configured by software (shown in FIG. 3 in the form of removable storage media 72) to monitor and control downhole instruments 64, 65. System 66 includes a display device 68 and a user-input device 70 to enable a human operator to interact with the system control software 72.

In each of the foregoing logging environments, the logging tool assemblies preferably include a navigational sensor package that includes direction sensors for determining the inclination angle, the horizontal angle, and the rotational angle (a.k.a. "tool face angle") of the bottom hole assembly. As is commonly defined in the art, the inclination angle is the deviation from vertically downward, the horizontal angle is the angle in a horizontal plane from true North, and the tool face angle is the orientation (rotational about the tool axis) or angle from the high side of the wellbore. In accordance with known techniques, wellbore directional measurements can be made as follows: a three-axis accelerometer measures the earth's gravitational field vector relative to the tool axis and a point on the circumference of the tool called the "tool face scribe line". (The tool face scribe line is typically drawn on the tool surface as a line parallel to the tool axis.) From this measurement, the inclination and tool face angle of the bottom hole assembly can be determined. Additionally, a three-axis magnetometer measures the earth's magnetic field vector in a similar manner. Or gyro sensors can be used to measure angular velocity. From the combined gyro, magnetometer and accelerometer data, the horizontal angle of the bottom hole assembly may be determined. A motion-sensing unit can also be included to track the position of the tool. In many cases, the motion-sensing unit can derive the position information from the direction sensors.

Figure 4:
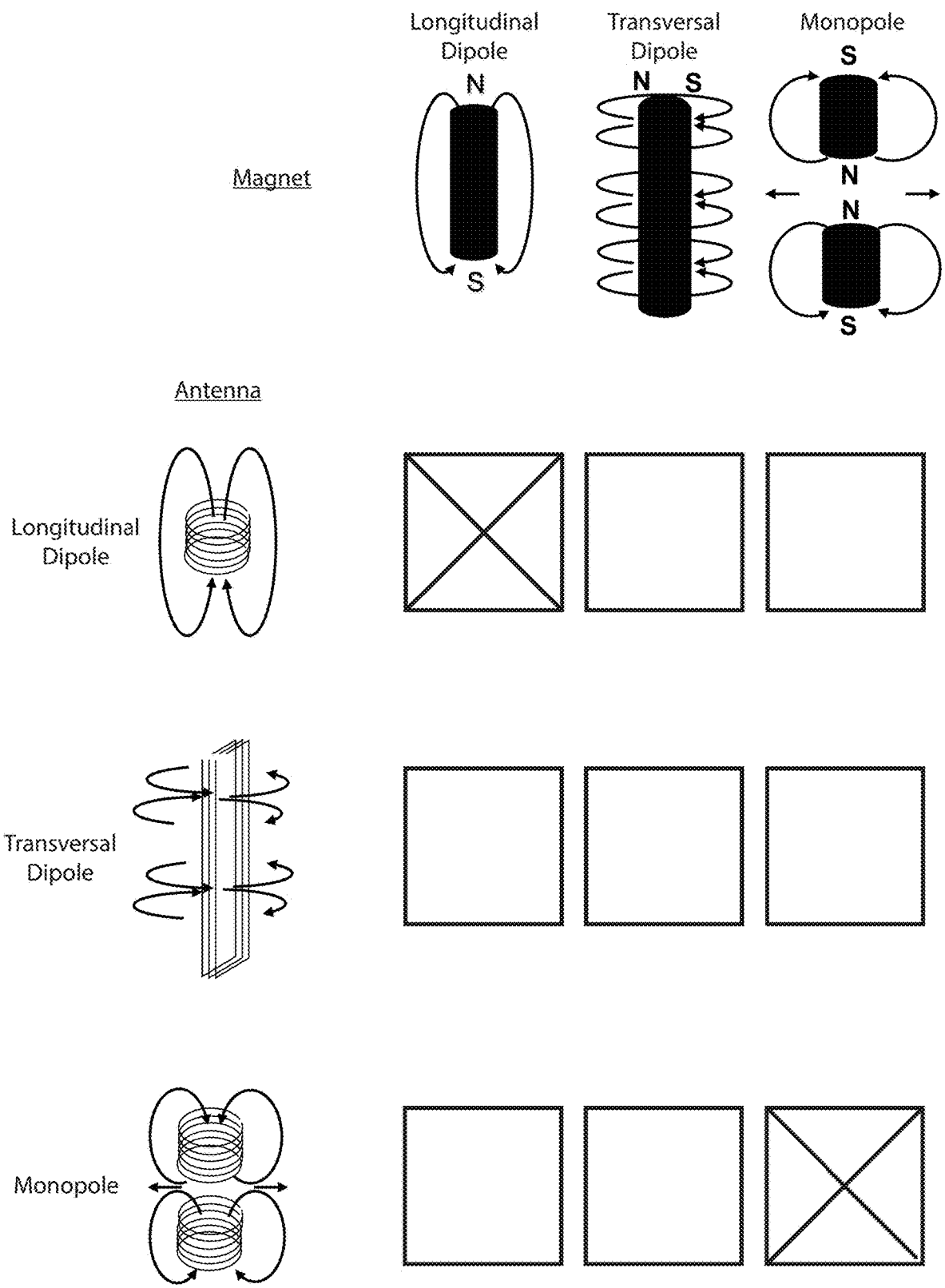
FIG. 4 shows views illustrative of magnet and antenna arrangements for all NMR tool designs.

FIG. 4 shows views illustrative of magnet and antenna arrangements for NMR tool designs. There are many elaborate magnet schemes to create the static magnetic field for down hole logging. The building blocks for all of these schemes are the basic available magnetic field dimensional possibilities, as shown in FIG. 4: longitudinal dipole, transversal dipole, and monopole. These three building blocks can be used for the antenna and the magnet. Different combinations of these basic fields will create different sensitivities to the signal. The creation of shaped static magnetic fields, $B_0$ and the associated antenna field, $B_1$ which is best suited for an NMR experiment, is different depending on the intended application for the NMR tool. For instance, for a drilling environment, axial symmetric or nearly axial symmetric magnet field designs are considered preferable. The creation of these magnet fields may include a magnet which is composed of many pieces of magnet. The direction of those magnets may vary from axial to transversal, or even in a monopole direction, where the direction of the material is radial outward, or a combination thereof. The magnet may be created using magnet sections grouped together and placed at carefully designed spacings to get the desired magnetic field shape. Magnets in opposing magnetic direction to the other magnets in the main configuration may be placed to stretch, weaken, change the gradient, or shape the field. The magnet and antenna fields may be created also with the addition of magnetically permeable material. The location of the magnetically permeable material is not limited to under the antenna, where being "under the antenna" means closer to the center of the tool radially than the antenna, but in most configurations, there will be some magnetically permeable material under the antenna. The antenna may be placed directly adjacent to the permeable magnetic material or have a specific spacing between the antenna and the material.

Magnet/antenna configurations may be created that have more than one sensitive volume. The sensitive volume is the volume from which NMR signal will be observed. Magnet/antenna configurations may be created that use more than one antenna. The additional antenna may be used to collect data from the more than one volume. However, in some cases, a second antenna will collect data from the same sensitive volume. A third antenna might even be used to collect data from the same sensitive volume for select combinations. In the case where more than one antenna collects data from the same sensitive volume it is best if those antennas are orthogonal.

Combinations like monopole magnet with longitudinal dipole antenna, transversal dipole magnet with transversal dipole antenna, and longitudinal dipole magnet with transversal dipole create round enough magnetic fields to be used in a downhole drilling environment, as indicated in a combination matrix shown in FIG. 4. The only combinations which are not used because the signal will be practically zero are longitudinal dipole magnets with longitudinal dipole antennas and monopole magnets with monopole antennas, as indicated by X's in the combination matrix.

Figure 5A:
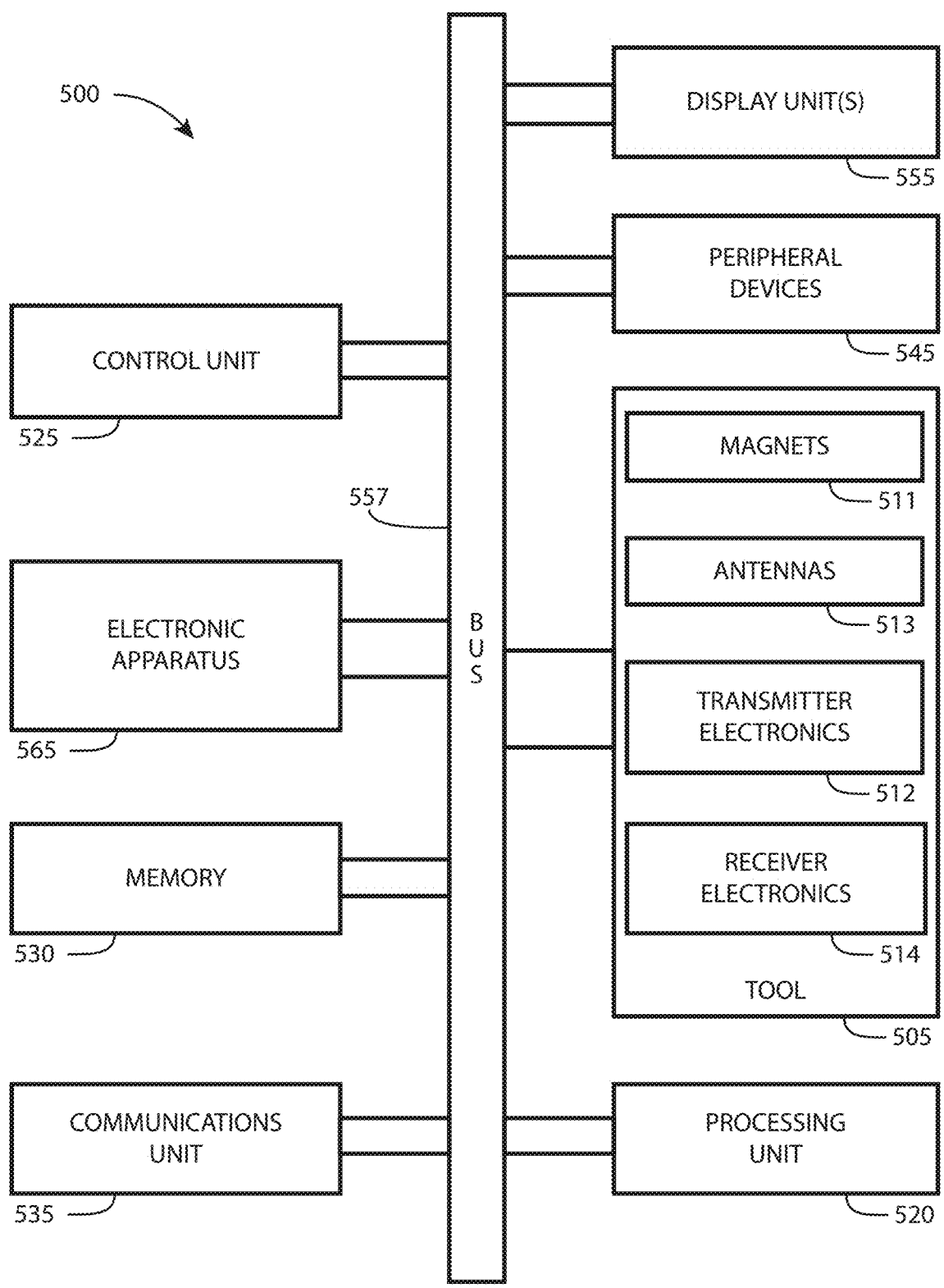
FIG. 5A is a block diagram of features of an example embodiment of a system operable to process nuclear magnetic resonance data and prepare for sending uphole.

FIG. 5A is a block diagram of features of an example embodiment of a system operable to process nuclear magnetic resonance data which is less demanding to send uphole from an NMR logging tool 505, as described herein or in a similar manner. The system 500 can include the NMR tool 505 having an arrangement of magnets 511, antenna(s) 513, transmitter electronics 512, and receiver electronics 514. The system 500 can be configured to operate in accordance with the teachings herein.

The system 500 can include a control unit 525, a memory 530, an electronic apparatus 565, and a communications unit 535. The memory 530 can be structured to include a database. The control unit 525, the memory 530, and the communications unit 535 can be arranged to operate as a processing unit to control operation of the transmitter electronics 512 and the receiver electronics 514 and to perform operations on the signals collected by the receiver electronics 514 to process nuclear magnetic resonance data generated by the NMR logging tool 505. A processing unit 520, structured to process nuclear magnetic resonance data of the NMR logging tool 505, can be implemented as a single unit or distributed among the components of the system 500 including electronic apparatus 565. The control unit 525 and the memory 530 can operate to control activation of the transmitter electronics 512 to generate echo train sequences and recovery pulses. The control unit 525 and the memory 530 can operate to control selection of the receiver electronics 514 in the tool 505 and to manage processing schemes. The control unit 525, the memory 530, and other components of the system 500 can be structured, for example, to operate similar to or identical to the components discussed herein or similar to or identical to any of the methods discussed herein.

The system 500 can also include a bus 557, where the bus 557 provides electrical conductivity among the components of the system 500. The bus 557 can include an address bus, a data bus, and a control bus, each independently configured or in an integrated format. The bus 557 can be realized using a number of different communication mediums that allow for the distribution of components of the system 500. Use of the bus 557 can be regulated by the control unit 525. Bus 557 can include a communications network.

In various embodiments, the peripheral devices 545 can include additional storage memory and other control devices that may operate in conjunction with the control unit 525 and the memory 530. In an embodiment, the control unit 525 can be realized as a processor or a group of processors that may operate independently depending on an assigned function. The system 500 can include display unit(s) 555, which can be used with instructions stored in the memory 530 to implement a user interface to monitor the operation of the tool 505 or components distributed within the system 500.

The components shown in FIG. 5A need not be distributed as shown. Some of the components may be located on the surface, some in the tool 505, some in other locations in the drill string 8, wireline logging tool 34, logging tools 65, or some other location in the systems illustrated in FIGS. 1, 2, and 3, and some may be distributed among those locations.

Figure 5B:
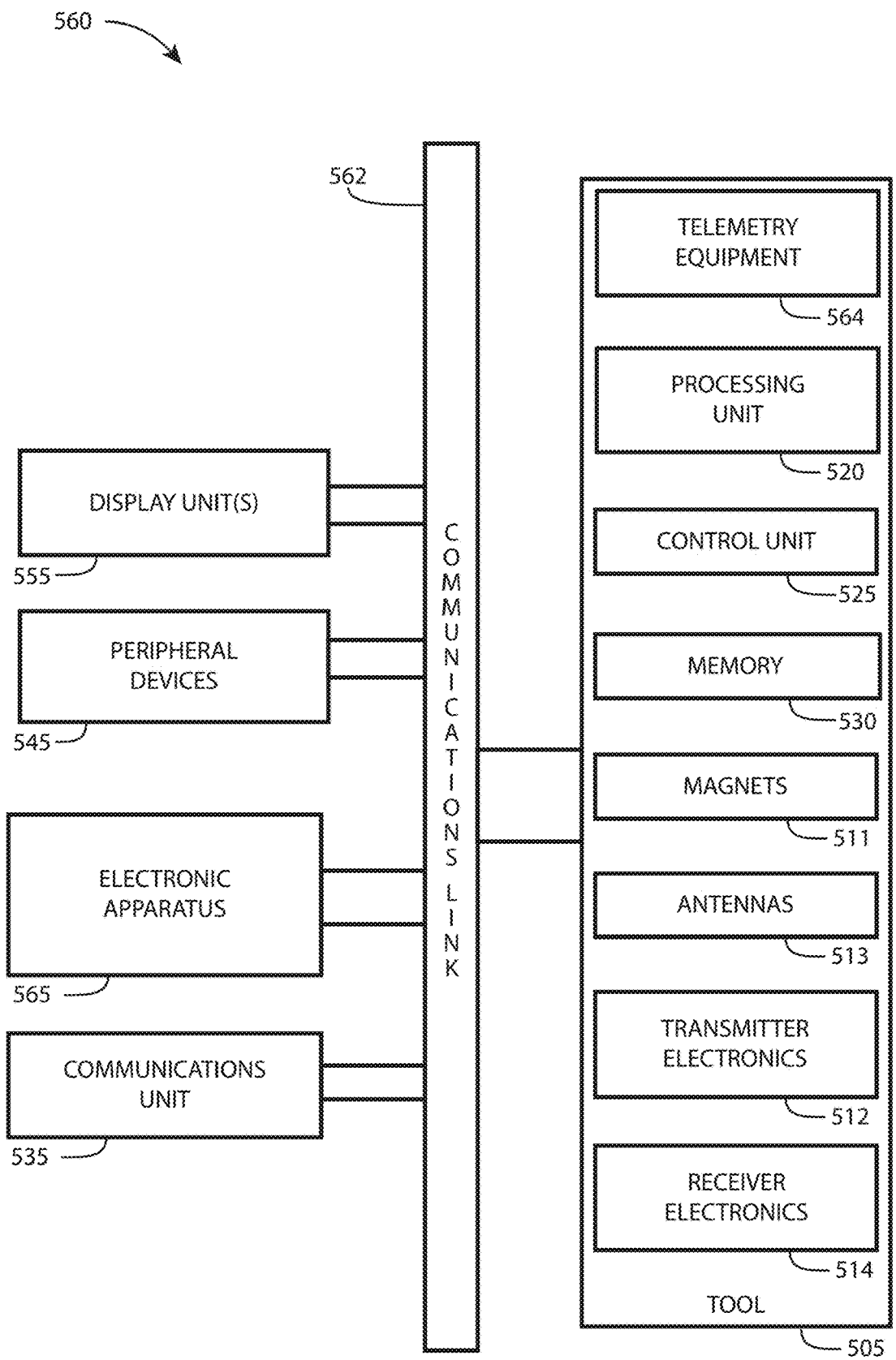
FIG. 5B is a block diagram of features of an example embodiment of a system operable to process nuclear magnetic resonance data.

FIG. 5B is a block diagram of features of another example embodiment of a system operable to process nuclear magnetic resonance data of an NMR logging tool, as described herein or in a similar manner. In the system 560 illustrated in FIG. 5B, the processing unit 520, the control unit 525, and the memory 530 are located in the tool 505. The components in the tool 505 communicate via a communications link 562 using telemetry equipment 564 to communicate with, for example, the communications unit 535.

Figure 6:
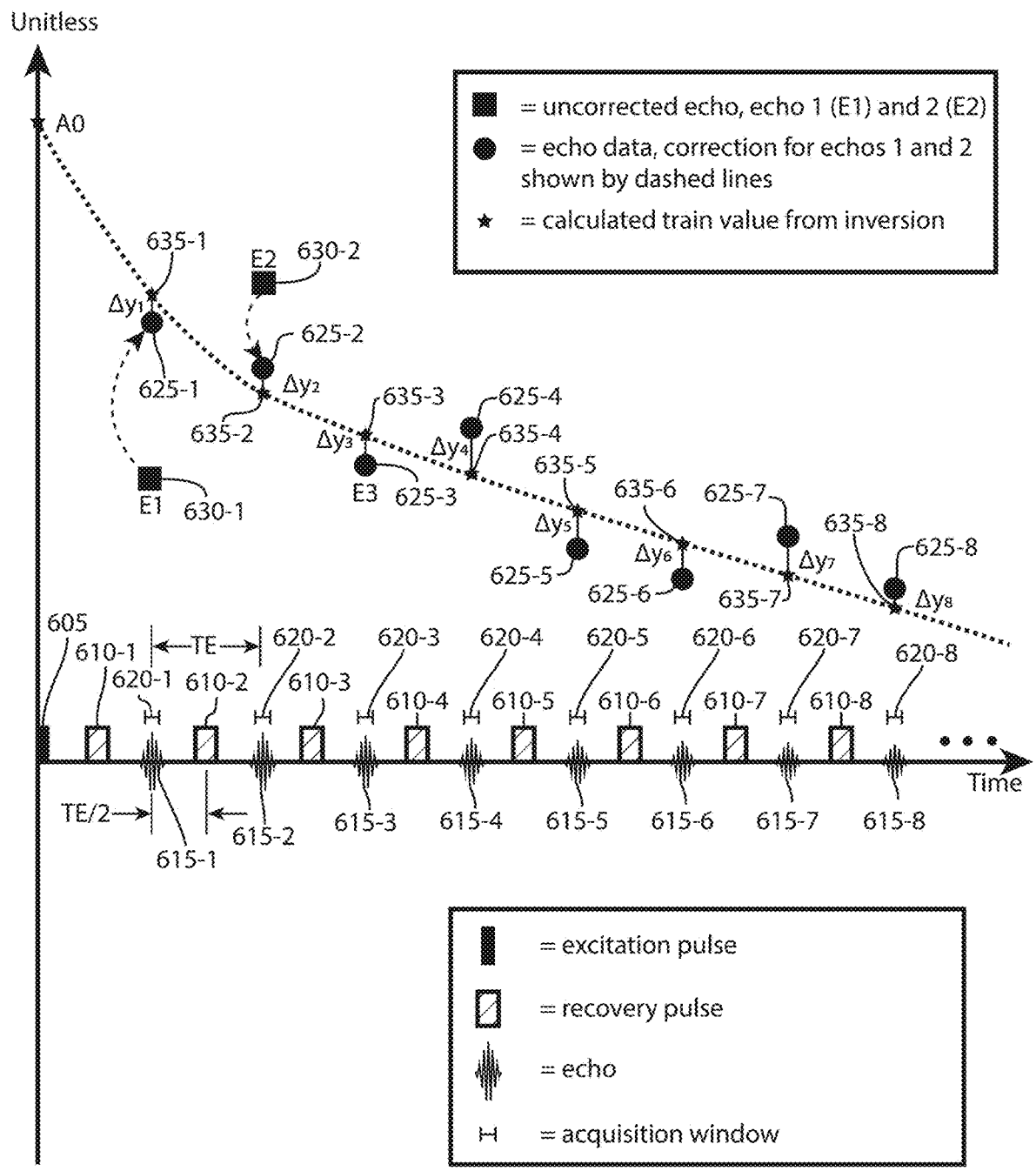
FIG. 6 is a representation of a CPMG sequence.

FIG. 6 is a representation of a CPMG sequence. FIG. 6 illustrates an excitation pulse 605 and a sequence of recovery pulses 610-1, 610-2, ..., 610-8. In this non-limiting example sequence, eight recovery pulses 610-1, 610-2, ..., 610-8 cause eight echoes 615-1, 615-2, ..., 615-8, where the peak amplitudes of the echoes are equally spaced apart by a peak to peak time distance, TE (echo time), that corresponds to the equally spaced apart time distances of the recovery pulses. Recovery pulses are not limited to eight pulses, but the number used may depend on the application and/or measurement parameters. Also indicated are acquisition windows 620-1, 620-2, ..., 620-8 for capturing the signal of an echo, a first echo $E_1$, a second echo $E_2$, and a third echo $E_3$. A0 is the amplitude of the echo train at time zero. A0 is not measured but is calculated by using an exponential decay fitting curve determined from the third echo $E_3$ to the last echo. $E_1$ and $E_2$ can be included if they are corrected. These echoes decay according to the $T_2$ of the medium. Magnetization will be allowed to recover fully or partially for the next sequence, then a medium can be probed again by another sequence.

A $T_1$ experiment downhole consists of a flipping or nulling of the magnetization in the positive z-direction through an inversion, excitation, or saturation pulse followed by a CPGM sequence. The time between the saturation pulse and the CPMG sequence, designated as wait time (WT), is varied in the τ (time) domain. This allows for the built-up magnetization in the z-axis to be measured. Any number of wait times can be used ranging from a minimum of 2 to a practical limit of about 100; for example, in practice, a minimum of 3 is used. There is no upper limit on how many WTs can be used; however, it is preferred to keep the number lower so that the vertical resolution of the data is kept minimal, battery life is extended or the tool is run on batteries, processing power downhole is usable, and stress on electronics is minimal.

Figure 7:
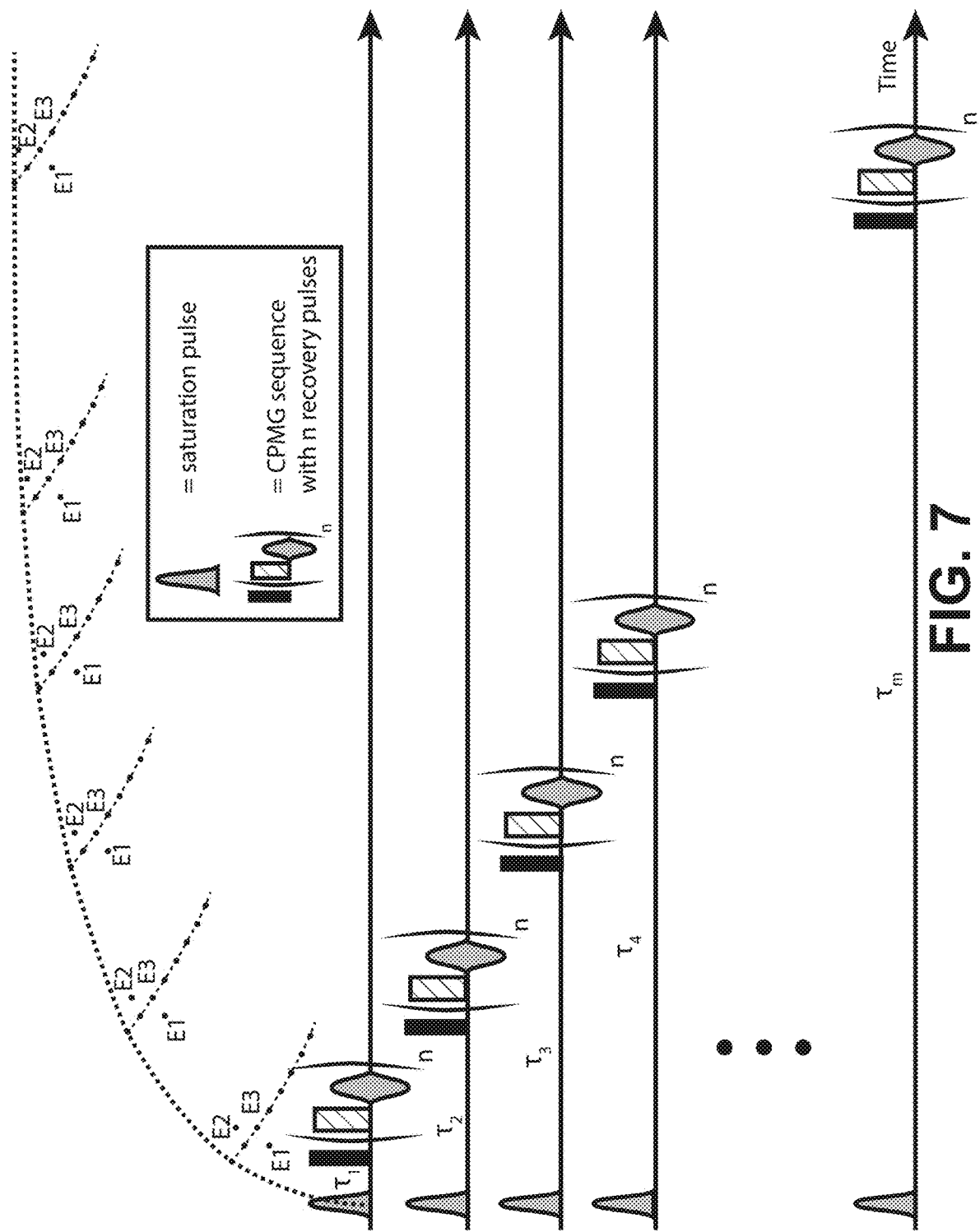
FIG. 7 is a diagram of a $T_1$ experiment.

FIG. 7 is a diagram of a $T_1$ experiment. The individual CPMGs for each WT can have any number of echoes. The WTs in FIG. 7 are as shown as $\tau_1, \tau_2, \ldots, \tau_m$. Commonly, the longest wait time can have a significantly larger number of echoes taken. Lower WTs do not need as many echoes as less magnetization has recovered and the data decays into the noise quickly.

The values in the echo train measurement 625-1, 625-2, . . . , 615-8, $Y_{result}$, are shown as solid circles immediately above or below their respective echoes in FIG. 6. The initial values calculated for echo 1 (shown as solid square 630-1) and echo 2 (shown as solid square 630-2) are corrected as indicated by the dashed arrows, to result in echo train measurements 625-1 and 625-2.

The NMR tool acquires echoes based on the pulse sequence used, here this data is designated as S(t). To interpret the data, S(t) is inverted into a different basis: $T_2$ (i.e., transverse relaxation), $T_1$ (i.e., longitudinal recover time), or D (i.e., diffusion). The inversion produces spectrum components which are correlated to a time ($T_1$ or $T_2$) or diffusion axis. The spectrum can then be used to make petro-physical conclusions about the formation. To perform this inversion, the data is fit to known answers.

$$S(t) = \sum_{uvh} x_{uv} \cdot A(T_{1u}, T_{2v}, D_h, t) \qquad (1)$$

When the tool is stationary, the signal's known answer, omitting surface/volume interaction, depends on each wait time, diffusion coefficient, gradient, the time of the echo, T1, T2, and the TE. The signal from the tool only occurs with each echo and not a continuum of time and is referred to as y(n). The signal for the nth echo for the kth wait time and for the sth TE has the form:

$$y^{k,s}(n) = \sum_{h=1}^{r} \sum_{v=1}^{q} \sum_{u=1}^{p} x_{hvu} \cdot \left(1 - e^{-\frac{TW_k}{T_{1u}}}\right) \cdot e^{-\frac{t_n}{T_{2v}}} \cdot e^{-\frac{D_h(\gamma \cdot G_b \cdot TE_s)^2 \cdot t_n}{12}} \qquad (2)$$

where:
$y^{k,s}(n)$ is the nth echo for the kth wait time for the sth TE,
q is the total number of $T_2$ components,
p is the total number of $T_1$ components,
r is the number of diffusion constants, n is the count of the echo in a single wait time,
s is the number of the TEs,
$x_{111} \ldots x_{pqr}$ are the amplitudes of the respective spectrum components,
$TW_k$ is the kth wait time,
$T_{21} \ldots T_{2q}$ are the $T_2$ time constants for each of the q factors,
$T_{11} \ldots T_{1p}$ are the $T_1$ time constants for each of the p factors,
$TE_s$ is the sth inter-echo time,
$t_n$ is the time when the nth echo is acquired,
$D_h$ is the hth diffusion constant,
γ is the gyromagnetic ratio, and
$G_b$ is the average gradient for a single band b.

While equation (2) includes small assumptions, in practice equation (2) is easier to use if simplified. The exact simplification used may vary based on the parameter targeted. Common simplifications for equation (2) use a ratio between $T_1$ and $T_2$, only a single TE, assume a single Gradient (G), and assume a constant diffusion (D).

$$y^k(n) = \sum_{i=1}^{p} x_i \cdot \left(1 - e^{-\frac{TW_k}{T_{1i}}}\right) \cdot e^{-\frac{n \cdot TE}{T_{2i}}} \cdot e^{-\frac{D(\gamma \cdot G \cdot TE)^2 \cdot n \cdot TE}{12}} \qquad (3)$$

where:
$y^k(n)$ is the nth echo for the kth wait time,
p is the total number of $T_1$ components, T1 components are also known as bins,
$x_1 \ldots x_p$ are the amplitudes of the respective spectrum components,
$TW_k$ is the kth wait time,
$T_{11} \ldots T_{1p}$ are the $T_1$ time constants for each of the p factors,
$T_{21} \ldots T_{2p}$ are the $T_2$ time constants for each of the p factors (note that to eliminate the j dimension of the x matrix in equation (1) and thereby simplify equation (2), $T_{2j}$ is assumed to be proportional to $T_{1i}$ so that $T_{2j}$ α $T_{1i}$ for all i and j for a particular wait time $TW_h$ and $T_{2j}$ is renamed $T_{2i}$),
TE is the inter-echo time (note that, to simplify equation (2), only one inter-echo time is assumed),
D is the diffusion constant,
γ is the gyromagnetic ratio, and
G is the gradient.

Now equation (1) simplifies likewise to:

$$S(t) = \sum_{i} x_i \cdot A(T_{1i}, T_{2i}, t) \qquad (1A)$$

The signal can be connoted in many ways. A simple way to handle the data is to form it into a simple vector where one wait time's echoes are followed by the next wait time's echoes. Equation (3) can be used to expand equation (1A) to form a matrix of known results for all wait times and echoes as below:

$$\begin{bmatrix} TW_1 & \begin{bmatrix} y^1(1) \\ y^1(2) \\ \cdots \\ y^1(n_1) \end{bmatrix} \\ TW_2 & \begin{bmatrix} y^2(1) \\ y^2(2) \\ \cdots \\ y^2(n_2) \end{bmatrix} \\ \cdots \\ TW_m & \begin{bmatrix} y^m(1) \\ y^m(2) \\ \cdots \\ y^m(n_m) \end{bmatrix} \end{bmatrix} = \begin{bmatrix} A^1_{11} & A^1_{21} & \cdots & A^1_{p1} \\ A^1_{12} & A^1_{22} & \cdots & A^1_{p2} \\ \cdots & \cdots & \cdots & \cdots \\ A^1_{1n_1} & A^1_{2n_1} & \cdots & A^1_{pn_1} \\ A^2_{11} & A^2_{21} & \cdots & A^2_{p1} \\ A^2_{12} & A^2_{22} & \cdots & A^2_{p2} \\ \cdots & \cdots & \cdots & \cdots \\ A^2_{1n_2} & A^2_{2n_2} & \cdots & A^2_{pn_2} \\ \cdots & \cdots & \cdots & \cdots \\ A^m_{11} & A^m_{21} & \cdots & A^m_{p1} \\ A^m_{12} & A^m_{22} & \cdots & A^m_{p2} \\ \cdots & \cdots & \cdots & \cdots \\ A^m_{1n_m} & A^m_{2n_m} & \cdots & A^m_{pn_m} \end{bmatrix} \begin{bmatrix} x_1 \\ x_2 \\ \cdots \\ x_p \end{bmatrix} \quad (4)$$

Where
m is the total number of WTs,
$A_{ij}^k = A_{T2\ bin,echo\ number}^{WT\ number}$ is a basis function that can be used to invert the data into the $T_1$ or $T_2$ time domains, and
j is the count of echoes in a sequence of wait times.
For an average gradient and single TE:

$$A_{ij}^k = A_{T2bin,echo\ number}^{WTnumber} = \left(1 - e^{-\frac{TW_k}{T_{1i}}}\right) \cdot e^{-\frac{j \cdot TE}{T_{2i}}} \cdot e^{-\frac{D(\gamma \cdot G \cdot TE)^2 \cdot n \cdot TE}{12}} \quad (5A)$$

Equation (5A) is a basis function that can be used to invert the data into the $T_1$ or $T_2$ time domain with the coefficients being used as a spectrum in those domains. Other basis functions are possible.

For example, a basis function may only involve $T_2$. In the case where only a single WT is used and only a $T_2$ inversion is being done, a basis function that can be inverted to determine $T_2$ only may be:

$$A_{ij}^k = e^{-\frac{j \cdot TE}{T_{2i}}} \cdot e^{-\frac{D(\gamma \cdot G \cdot TE)^2 \cdot n \cdot TE}{12}} \quad (5B)$$

Further, the basis function is not limited to exponentials. A may be approximated linearly, such as that shown in Equation (5C):

$$A_{ij}^k = \left(1 - \frac{j \cdot TE}{T_{2i}}\right) \cdot e^{-\frac{D(\gamma \cdot G \cdot TE)^2 \cdot j \cdot TE}{12}} \quad (5C)$$

A may be approximated quadratically, such as that shown in Equation (5D):

$$A_{ij}^k = \left(1 - \frac{j \cdot TE}{T_{2i}} - \frac{1}{2}\left(\frac{j \cdot TE}{T_{2i}}\right)^2\right) \cdot e^{-\frac{D(\gamma \cdot G \cdot TE)^2 \cdot j \cdot TE}{12}} \quad (5D)$$

or A may be approximated with a higher order approximation.

In another example there are circumstances where assuming a ratio between $T_1$ and $T_2$ cannot not be used. Such is the case in a circumstance where a $T_1/T_2$ simultaneous inversion for a $T_1/T_2$ map needs to be created. A basis function may be created without assumptions about the ratio between $T_1$ and $T_2$ for a $T_1/T_2$ simultaneous inversion for a single TE, such as that shown in equation (5E).

$$A_{uvj}^k = \left(1 - e^{-\frac{TW_k}{T_{1u}}}\right) \cdot e^{-\frac{t_j}{T_{2V}}} \cdot e^{-\frac{D(\gamma \cdot G \cdot TE)^2 \cdot j \cdot TE}{12}} \quad (5E)$$

This basis function has more dimensions than those previously shown and the A basis is now a 3 dimensional matrix. In this circumstance equation (2) is used to expand equation (1) for the inversion.

The above equation (4) can be shortened as:

$$Y = AX \quad (6\text{-}1)$$

where:

$$Y = \begin{bmatrix} y^1(1) \\ y^1(2) \\ \cdots \\ y^1(n_1) \\ y^2(1) \\ y^2(2) \\ \cdots \\ y^2(n_2) \\ \cdots \\ y^m(1) \\ y^m(2) \\ \cdots \\ y^m(n_m) \end{bmatrix}, \quad (6\text{-}1a)$$

$$A = \begin{bmatrix} A^1_{11} & A^1_{21} & \cdots & A^1_{p1} \\ A^1_{12} & A^1_{22} & \cdots & A^1_{p2} \\ \cdots & \cdots & \cdots & \cdots \\ A^1_{1n_1} & A^1_{2n_1} & \cdots & A^1_{pn_1} \\ A^2_{11} & A^2_{21} & \cdots & A^2_{p1} \\ A^2_{12} & A^2_{22} & \cdots & A^2_{p2} \\ \cdots & \cdots & \cdots & \cdots \\ A^2_{1n_2} & A^2_{2n_2} & \cdots & A^2_{pn_2} \\ \cdots & \cdots & \cdots & \cdots \\ A^m_{11} & A^m_{21} & \cdots & A^m_{p1} \\ A^m_{12} & A^m_{22} & \cdots & A^m_{p2} \\ \cdots & \cdots & \cdots & \cdots \\ A^m_{1n_m} & A^m_{2n_m} & \cdots & A^m_{pn_m} \end{bmatrix}, \quad (6\text{-}1b)$$

$$X = \begin{bmatrix} x_1 \\ x_2 \\ x_3 \\ \cdots \\ x_p \end{bmatrix}, \text{ and} \quad (6\text{-}1c)$$

The A matrix shown above can be two dimensional or three dimensional. Generally, Y is a vector of echoes taken in a sequence called an "activation." The A matrix is the basis function matrix created to fit the data. And X is the vector of coefficients which minimize the difference between the data and basis function. X is also a vector of coefficients which create the spectrum when plotted against the T1, T2, or D basis axis The spectrum vector X is given by:

$$X = A^{-1}Y \quad (6\text{-}2)$$

When the NMR tool is moving at a speed v, the stationary equations above no longer apply. A taking into account the moving speed is A(v). The corresponding Y is Y(v). X remains the same because X is an intrinsic property of the formation. There are many factors in the echo train that can change while in motion. There is the polarization of the $T_1$, captured in a $T_1$ sequence. There is the decay of the echo train captured by a CPMG, or CPMG derived sequence. There are inflicted phases that are similar to a diffusion measurement, captured by doing a diffusion editing like sequence. However, in an adiabatic condition these phases may not be observed.

When the tool is in motion, equation (6-1) can be re-written as:

$$Y(v) = A(v)X \quad (7\text{-}1)$$

The inversion can be done using the equation (7-1) producing a solution as in equation (7-2):

$$X = A(v)^{-1}Y(v) \quad (7\text{-}2)$$

If the inverse of the stationary matrix A is used in equation (7-2), the result is:

$$X^* = A^{-1}Y(v) = A^{-1}A(v)X \quad (7\text{-}3)$$

In this method, X is not found directly during the inversion and a correction needs to be done. Since A(v) is different from the stationary A due to $B_0$ inhomogeneity, $A^{-1}A(v)$ is not equal to the unit matrix I, which means that $X^*$ is not the same as X In other words, if the stationary matrix A is used with data collected with the NMR tool is moving, an error is created. This is called motion effect.

Consider corrections to $X^*$. The term $X^*$ can be corrected by the following equation:

$$X = A(v)^{-1}AX^* \quad (8)$$

where $A(v)^{-1}$ A is called the motion correction matrix.

The term A can be calculated directly. As shown above, constructing the A(v) matrix under non-zero speed is a key to removing motion effect. Correct inversion can be achieved either by using A(v) (motion dependent) in inversion or by using the stationary A and then correcting as in equation (8).

As discussed above, the column vector in A(v), Vector $A_i^k$ (equation 6-1e), is the combined echo trains with all recovery times $TW_1$, $TW_2$, . . . and $TW_m$, but the same $T_1$ time constant and $T_2$ time constant for each recovery time. If $B_0$ is known, the A(v) matrix can be calculated either analytically or through simulation. Because A(v) is a function of speed and $T_1/T_2$ values, the combination of a different speed and different $T_1/T_2$ value is big, the amount of computation is huge. One way to reduce computation is to decrease the number of different speeds but interpolate/extrapolate to correct speed. Another technique is to adjust the number of $T_1/T_2$ components (bins).

To calculate A(v) correctly is not a simple matter. A simplification can be made where a simple cylinder shape is considered for the volume. In this case, analytical equations can be created for the $T_2$ echo losses in A(v) such as:

$$A(v) = (1 - ROP*n*TE)*s(t)$$

With the complex shapes of the magnetic field, the correct A(v) does not have a simple analytical form. One way of creating A(v) more accurately includes procedures to simulate the echo train completely mathematically using the knowledge of B0 and B1. Because this calculation is time consuming, one set of A(v) can be been made using the theoretically perfect B0 and B1, instead of by measuring the field from each real logging tool with a Gauss meter and creating A(v) for each tool.

The magnetic and rf fields can be meshed into small voxels, where each voxel has a $B_0$, $B_1$, and an amount of micro magnetization. A finer mesh provides more accurate echo trains, however, becomes more and more computationally challenging. The tool's response, emf, from any voxel, as in the gridded space of FIG. 10 (discussed below), can be calculated using the principle of reciprocity, as outlined in Hoult, D., 2000, The principle of reciprocity in signal strength calculations—A mathematical guide: Concepts of Magnetic Resonance, 12, (4), 173-187. Then, the micro magnetizations are followed through time using the Bloch equation or rotation matrices. In this way, different A(v) can be found for different ROPs and $T_1$.

$$A(v, T1, ROP) \propto \int \int \int^V \text{micro magnetization}(t, T1, ROP) dx dy dz \quad (9)$$

Figure 8:
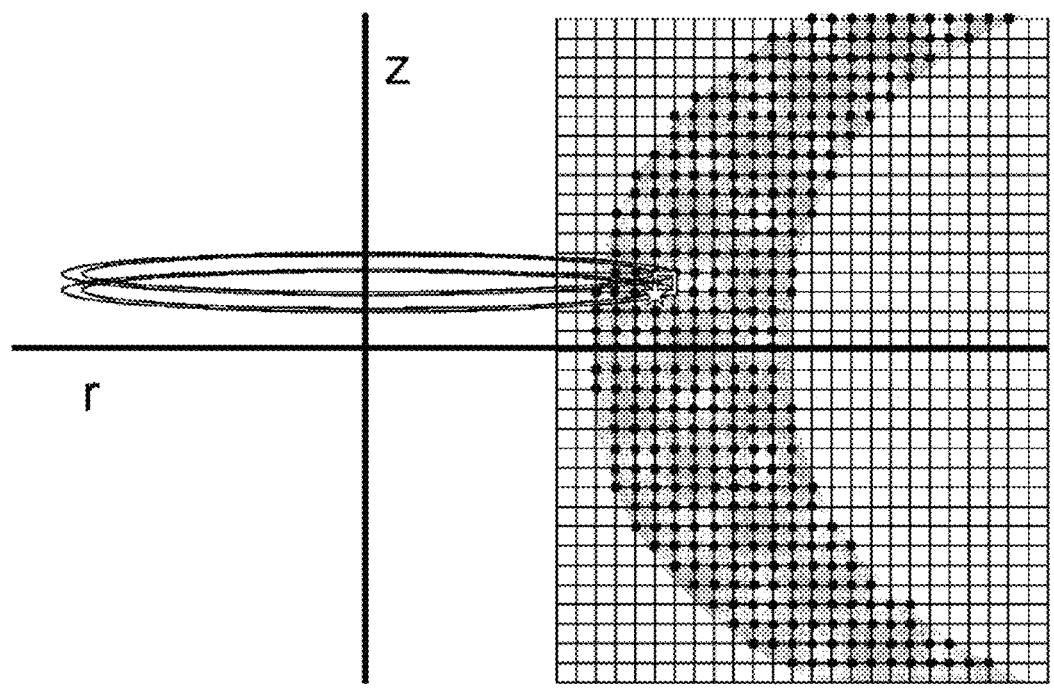
FIG. 8 is a pictorial of a selected sensitive region in a magnetic field.
Figure 9:
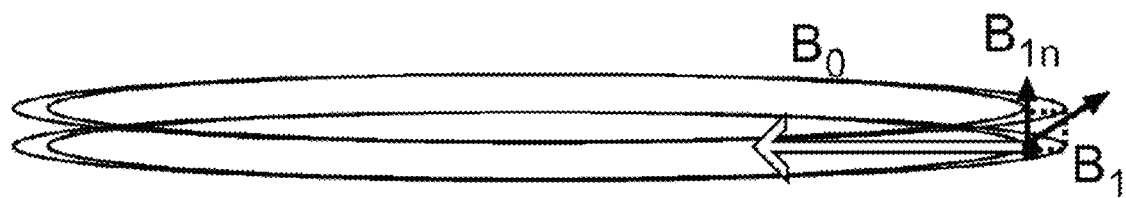
FIG. 9 is a representation of a rotationally symmetric voxel.

FIG. 8 is a pictorial of a selected sensitive region in a magnetic field. This field is split into many voxels. At each voxel a micro magnetization, uses the time dependent $B_1$ and the $B_0$ to calculate a signal for a specific time. That micro magnetization is rotated using excitation and refocusing pulses at specific times to obtain a theoretical echo train. FIG. 9 is a representation of a rotationally symmetric voxel. This allows a simplification in the calculation to go from 3D to 2D using the annulus volume.

Creating the A(v) can be performed using the following steps. First, a zero ROP emf, where the emf is a stimulated signal picked up in the coil which created the $B_1$, is found just as a calibration would be performed on the tool. This allows to rescale the A(v) into the units of porosity instead of in voltage units.

For non-zero ROP calculations, it is simplest to use the tool as a reference frame, that is, as if the tool were stationary and the formation continually moving, however the opposite can also be done. In this case, the magnetization field is moved in relation to the $B_0$ and $B_1$ fields at the ROP. The magnetization, M(t), is a function of speed v, $T_2$ decay, $T_1$ recovery time, $B_0$, and $B_1$. A steady state micro magnetization vector is created for each volume with the micro magnetization aligned with Bo. The direction of $B_0$ in each voxel can be designated as: $\hat{z} = [0\ 0\ 1]$. For a motion along the tool, the calculation is in the adiabatic case, and the Barry phase is not an issue. However, if calculating for other motions such as the vibrational plane the Barry phase should be accounted for or smaller voxels and time increments used.

The sensitive volume is then selected from the $B_0$ field using the tool operating frequency and pulse duration or Fourier transformation of a realistic pulse. The saturation/inversion pulse is used to null/invert the magnetization in that sensitive volume. Typically, a saturation/inversion pulse can have a bandwidth between ±3 to ±10% of the tool's operating frequency. It generally will be larger than the excitation pulse's bandwidth. If only a $T_2$ sequence in motion is to be calculated there would be no saturation/inversion pulse.

The micro magnetization is then allowed to recover for a total time equaling the wait time. Recovery occurs in small time increments, $\Delta t$, using the following equation:

$$M_{t_{i+1}} = (M_{t_i} + (\chi B_0 - M_{t_i}))(1 - e^{-\Delta t/T_1})\hat{z} \quad (10)$$

where M is the micro magnetization to be integrated over, and $\hat{z}$ is the unit vector in the direction of local z, and $\chi$ is the magnetic susceptibility.

The excitation can be performed with or without considering the pulse width. Without considering the pulse shape and timing, the pulse is computed as an instantaneous event. More complex considerations of the pulse can be done, however, for simplicity only this one is discussed. The excitation pulse can be done with any phase. The refocusing pulse then is best when it is shifted 90° out of phase from the excitation pulse. For example, the excitation pulse could be along the "x" axis, while the refocusing pulse is along the "y" axis. The micro magnetization vector is then rotated using the rotation matrix. For the case of an "x" pulse $$R_x(\theta) = \begin{bmatrix} 1 & 0 & 0 \\ 0 & \cos\theta_{tipE} & -\sin\theta_{tipE} \\ 0 & \sin\theta_{tipE} & \cos\theta_{tipE} \end{bmatrix} \quad (11)$$

The tipping angle, $\theta_{tipE}$, for each voxel is determined using the strength of $B_1$ perpendicular to $B_0$, $B_{1n}$, at the voxel's location:

$$\theta_{tipE} = \pi \gamma B_{1n} \tau_{excitation} \quad (12)$$

Where $\gamma$ is the gyromagnetic ratio and $\tau_{excitation}$ is the duration of the excitation pulse.

Following the excitation pulse, the micro magnetization is allowed to precess freely around the static field for ½ TE, where TE is the echo time. From the Bloch equation, it is known that magnetization undergoes a precession under the influence of a magnetic field, which can be simply represented as a rotation:

$$R_z(\theta) = \begin{bmatrix} \cos\theta_{FID} & -\sin\theta_{FID} & 0 \\ \sin\theta_{FID} & \cos\theta_{FID} & 0 \\ 0 & 0 & 1 \end{bmatrix} \quad (13)$$

During this time, the magnetization is still recovering by means of equation (12). So, the rotation is also performed in small time increments, $$\theta_{FID} = 2\pi \gamma B_0 \Delta t$$

until a total time of ½ TE has passed.

During the free induction decay (FID), it is easy to assess that magnetization spreads within a couple of hundred microseconds to the point where no signal would be measured, making the reason for a recovery pulse obvious.

The first step to recovering the magnetization is to perform a pulse, which will flip the fast and slow spins' phases. Ideally, this would be a 180° pulse; but, as with the excitation pulse, the exact rotation each voxel undergoes will be dependent on the $B_{1n}$.

$$R_y(\theta) = \begin{bmatrix} \cos\theta_{tipR} & 0 & \sin\theta_{tipR} \\ 0 & 1 & 0 \\ -\sin\theta_{tipR} & 0 & \cos\theta_{tipR} \end{bmatrix} \quad (14)$$

where:

$$\theta_{tipR} = \pi \gamma B_{1n} \tau_{recovery} \quad (14\text{-}1)$$

Where $\tau_{recovery}$ is the duration of the recovery pulse, aka the pulse intended to be a 180° pulse.

This calculation is repeated for all of the wait times in the $T_1$ experiment and for $T_1$ spanning a range of time, for example, between 0.001 s and 10 s, or all the TEs, or all the $T_2$ decays desired to be investigated in the pulse sequence. For very small Tis the motion effect will be minimal. So for $T_1$ between 0.001 s and 0.5 s, for instance, the results of equation 2 or any of its simplifications could be used in place of the model.

The porosity overall can be correctly accounted for using a more accurate A matrix during inversion processing. Porosity over call is one of the motional effects. There are two ways to gain too much polarization in relation to the stationary measurement. The first is that the movement causes the sensitive region to move out of the "nulled" zone during the saturation/null pulse. Thus, instead of a partial recovery there is part of the volume that has full recovery. The second mechanism by which the porosity can over call is by magnetization which relaxed within a higher magnetic field moved into the sensitive region faster than the magnetization could reach a new equilibrium. These two effects stack onto each other in most cases since the slowest drilling speed is around 40 ft/hr. The A matrix, A(v), can be constructed for a number of different speeds with different Tis. Although this technique requires long computational time for developing the A(v)s, it only requires being performed once. For low-gradient logging tools, the method proves to be very accurate. In tests, data generated had an average overcall of 2 PU (porosity units) attributed to the motion effects on a short aperture. Applications of one or more techniques taught herein may also provide real-time application as data is logged at a well site.

The inversion may be be done by many methods including singular value decomposition (SVD), regularization, or another inversion method for minimizing the fitting error. Such inversions may be done on the uphole inversion or the downhole inversion or both.

X coefficients may be interpreted to determine formation characteristics. The term "bin" is mentioned above (see, e.g., Equation (5)). A bin may be the time (either the $T_1$ or $T_2$ time) to which the X coefficient corresponds. For example, using the basis function in Equation (5), $x_1$ corresponds to the $T_{11}$ or $T_{21}$ time. Thus, conventionally, the data to be telemetered to the uphole processing system is the X coefficient (e.g., $x_1$) and the $T_{11}$ or $T_{21}$ time. To conserve telemetry bandwidth between a downhole system and an uphole processing system in an LWD system or a wireline system (if telemetry bandwidth is limited), a system may limit the number of X coefficient of data that may be telemetered between a NMR tool and an uphole processing system to a prescribed number of bins, which may limit the precision of the calculations that can be done by the uphole processing system.

Figure 10:
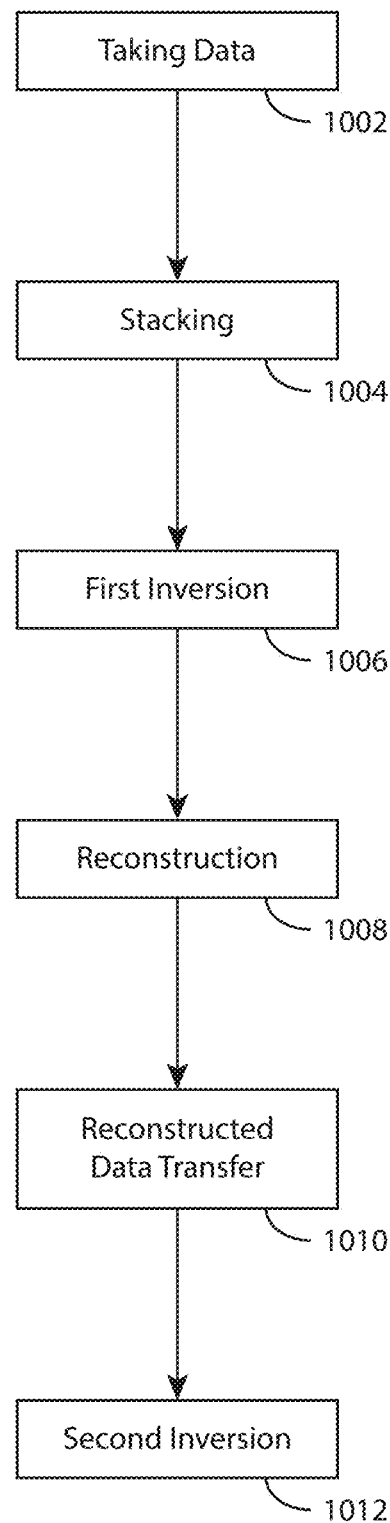
FIG. 10 is a flow chart of a technique for reducing the amount of data to be telemetered uphole from an NMR tool, while providing improved quality.

FIG. 10 is a flow chart of a technique for reducing the amount of data to be telemetered uphole from an NMR tool, while providing improved quality. A technique for reducing the amount data to be telemetered uphole from an NMR tool, while maintaining quality, may include the following subprocesses, as shown in FIG. 10: taking data 1002, stacking 1004, a first inversion 1004 performed downhole, reconstruction 1008, reconstructed data transfer 1010, and a second inversion 1012 (performed uphole). In this technique, unlike the conventional technique described above, the X coefficient data is not sent uphole unless an inversion is performed that produces a set of X coefficient that fits within the available bandwidth. Instead, A0 and selected echo train data computed at known experimentation times, is transferred, thereby conserving data transfer bandwidth.

In one sub-technique, when the ROP is not known, downhole information can be transferred to the uphole processor via a subset of reconstructed data to perform the ROP-correct second inversion using the A(v) as described above. In another sub-technique, the ROP used to select the A(v) may be observed at the surface, for example by measuring the time and depth of the NMR tool and calculating the rate a drilling string is penetrating a well bore or by observing another parameter at the surface.

Stacking

In the "stacking" subprocess 1002, which is common to all the schemes described below, data collected during specific time windows, such as acquisition windows 620-1, . . . , 620-8 shown in FIG. 6, is combined in some way to time-equivalent data in a subsequent sequence. For example, selected data from the acquisition windows 620-1, . . . , 620-8 shown in FIG. 6 (such as the first point in acquisition window) may be averaged or combined in some other way with the selected data from a subsequent sequence. The stacked data may include a single instance of the echo data where no averaging is done. The stacked data may include the averaging of a phase alternated pair, where the excitation pulse, e.g., excitation pulse 605 in FIG. 6, and recovery pulses, e.g., pulses 610-1, . . . , 610-8 in FIG. 6, use different phases in the subsequent sequence. The stacked data may include many phase alternated pair sequences. The stacked data may average the averages of several phase alternated pair sequences.

First Inversion

The first inversion, which is performed downhole, may be one of the following (specific schemes for carrying out analysis of NMR data is discussed below in connection with FIG. 11; each of these schemes allows for use of one or more of the first inversions described here:

a $T_2$ inversion using equation (5B) as the basis function, a $T_{1i}/T_{2j}$ inversion using equation (3) (which is the same as equation (2) except that $T_{2j}$ is assumed to be proportional to $T_{1i}$ so that $T_{2j} \alpha T_{1i}$ for all i and j for a particular wait time $TW_k$ and $T_{2j}$ is renamed $T_{2i}$), as the basis function, or a $T_{1u}/T_{2v}$ inversion using equation (2).

Data Reconstruction

Generally, data reconstruction starts from the basis function used during the first inversions. The reconstructed data, $Y_{reconstructed}$, just as the original data was, is also a vector containing data at times for each different wait time and desired data point times within that wait time. Each reconstructed data point corresponds to one reconstruction time point in the vector times.

$$Y_{reconstructed} = \begin{bmatrix} y^1(1) \\ y^1(2) \\ \ldots \\ y^1(n_1) \\ y^2(1) \\ y^2(2) \\ \ldots \\ y^2(n_2) \\ \ldots \\ y^m(1) \\ y^m(2) \\ \ldots \\ y^m(n_m) \end{bmatrix},$$

$$times = t_j^k = \begin{bmatrix} t^1(1) \\ t^1(2) \\ \ldots \\ t^1(n_1) \\ t^2(1) \\ t^2(2) \\ \ldots \\ t^2(n_2) \\ \ldots \\ t^m(1) \\ t^m(2) \\ \ldots \\ t^m(n_m) \end{bmatrix},$$

The elements $y_{j_{reconstructed}}^k$ of $Y_{reconstructed}$ are calculated using the basis function that was used during the first inversion, such as equations (15A) and (15B).

$$y_{j_{reconstructed}}^k(t_j^k) = \sum_{i=1}^{p} x_i A_{ij}^k(t_{ij}^k) \tag{15A}$$

$$y_{j_{reconstructed}}^k(t_j^k) = \sum_{u=1}^{q} \sum_{v=1}^{p} x_{uv} A_{uvj}^k(t_{uvj}^k) \tag{15B}$$

Figure 13:
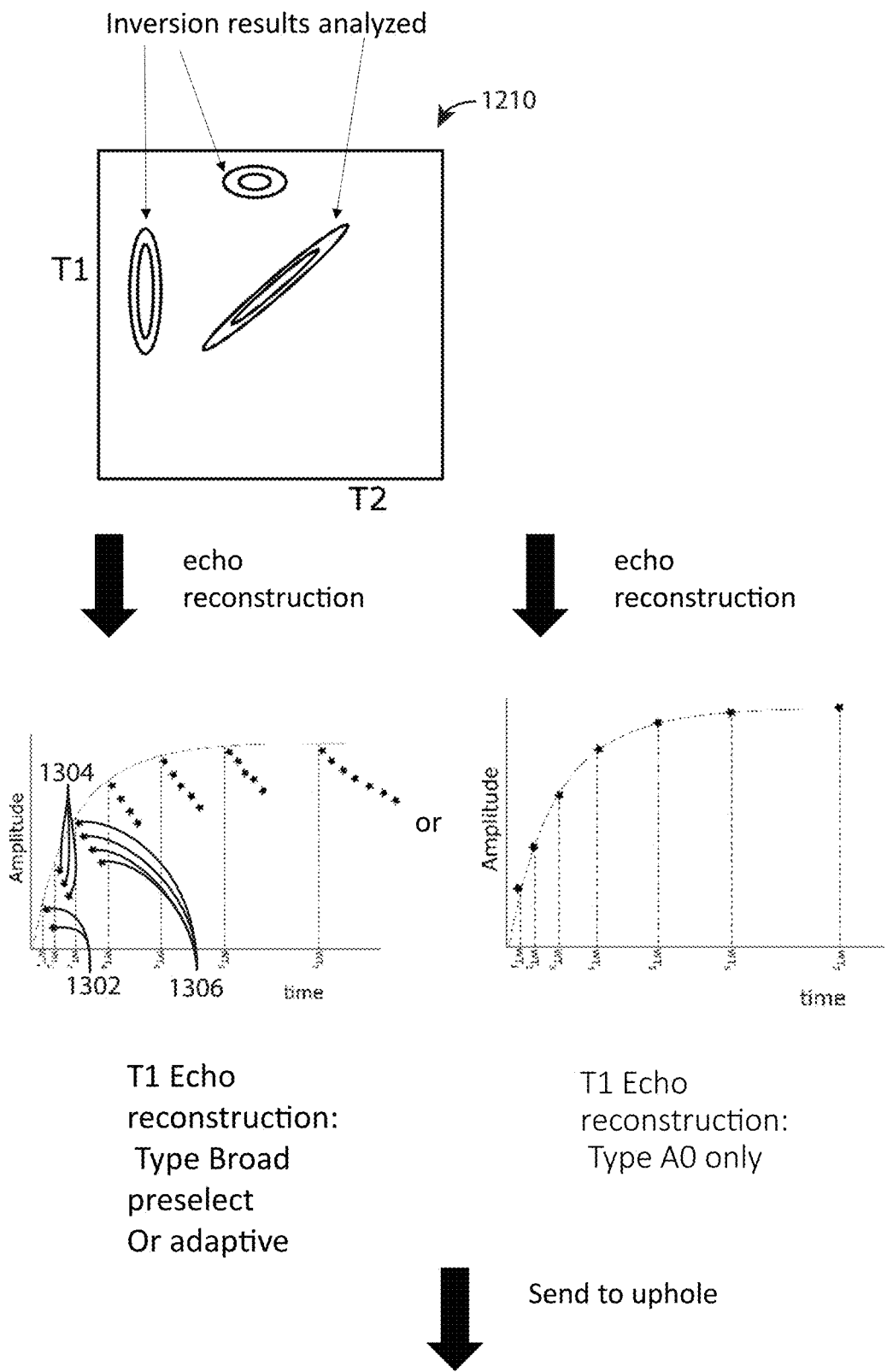
FIG. 13 is a chart illustrating reconstruction of echoes and A0 from inverted T1 data.

The number of points reconstructed for each wait time does not need to be the same, as illustrated in FIG. 13 (e.g., the reconstructed data for $WT_1$ may include 2 points 1302, the reconstructed data for $WT_2$ may include 3 points 1304, the reconstructed data for $WT_3$ may include 4 points 1306, etc.) in the above equation.

One of the most desired points to reconstruct is A0. The original basis function, if not derived from an equation, such as would be the case when using $A_{ij}^k(v)$, might not include an $A_{ij}^k(t=0)$. In this case, a correction factor is applied to determine A0. The correction factor may be calculated using the $T_2$ decay:

$$y = e^{-\frac{t}{T_{2i}}} \tag{16}$$

For example, if only the A0 were to be calculated, and only one TE was used, the reconstruction equation would be:

$$y^k_{j\,reconstructed}(t^k_j = 0) = \frac{\sum_{i=1}^{p} x_i A^k_{ij}(t = TE)}{e^{-\frac{TE}{T_{2i}}}} \quad (17)$$

Assuming $A_{ij}{}^k$ was created using equation (5A), reconstruction is open to any desired times for each WT, as shown in the following equation (ignoring diffusion effect):

$$y^k_{j\,reconstructed}(t^k_j) = \sum_{i=1}^{p} x_i \cdot \left(1 - e^{-\frac{TW_k}{T_{1i}}}\right) \cdot e^{\frac{t^k_j}{T_{2i}}} \quad (18)$$

In one technique, reconstructed $T_1$ data is A0 data for various WTs. A vector of A0 data (i.e., one A0 for each WT, or other times along the WT axis) can be reconstructed using the following equation for elements reconstruction:

$$y^k_{j\,reconstructed}(t = 0) = \quad (19)$$
$$\sum_{i=1}^{p} x_i \cdot \left(1 - e^{-\frac{TW_k}{T_{1i}}}\right) \cdot e^{-\frac{0}{T_{2i}}} = \sum_{i=1}^{p} x_i \cdot \left(1 - e^{-\frac{TW_k}{T_{1i}}}\right)$$

In another technique, for example, the reconstructed data could be for the first echo, as in the following equation:

$$y^k_{j\,reconstructed}(t^k_j = TE) = \sum_{i=1}^{p} x_i \cdot \left(1 - e^{-\frac{TW_k}{T_{1i}}}\right) \cdot e^{-\frac{TE}{T_{2i}}} \quad (20)$$

The reconstructed data may also include A0 along with non-zero times, as in the following equation, which, when evaluated for each k, produces a vector of reconstructed data for each WT:

$$y^k_{j\,reconstructed}(t^k_j = 0, \text{times} \neq 0) = \sum_{i=1}^{p} x_i \cdot \left(1 - e^{-\frac{TW_k}{T_{1i}}}\right) \cdot e^{-\frac{[t=0,t_k]}{T_{2i}}} \quad (21)$$

where $t_j{}^k$ are selected times.

Schemes for Implementing the Technique

Figure 11:
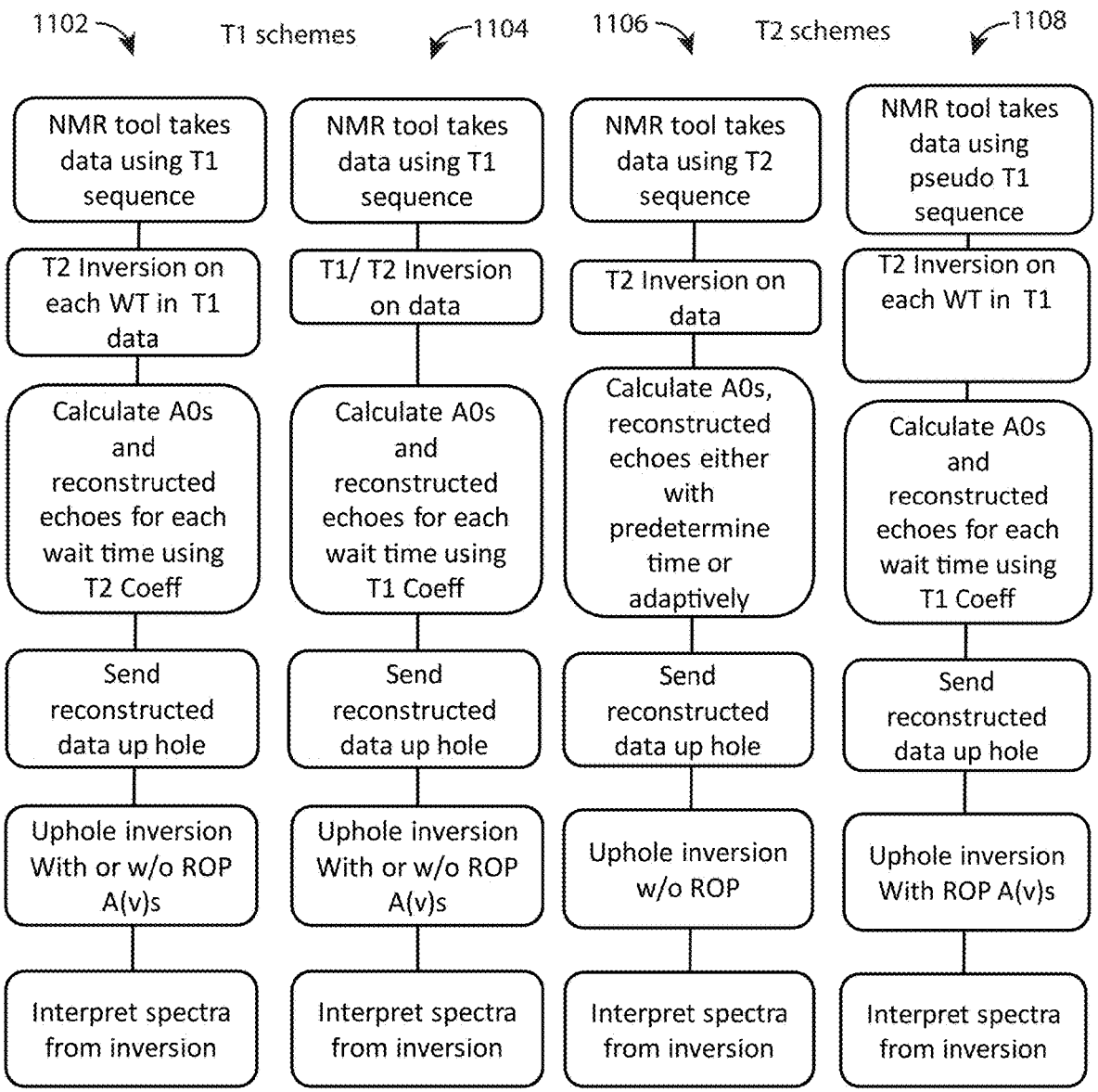
FIG. 11 illustrates four schemes for implementing the technique generally described above.

FIG. 11 illustrates four schemes for implementing the technique generally described above. The four schemes are divided into two sets of schemes, as illustrated in FIG. 11: $T_1$ schemes and $T_2$ schemes.

Figure 12:
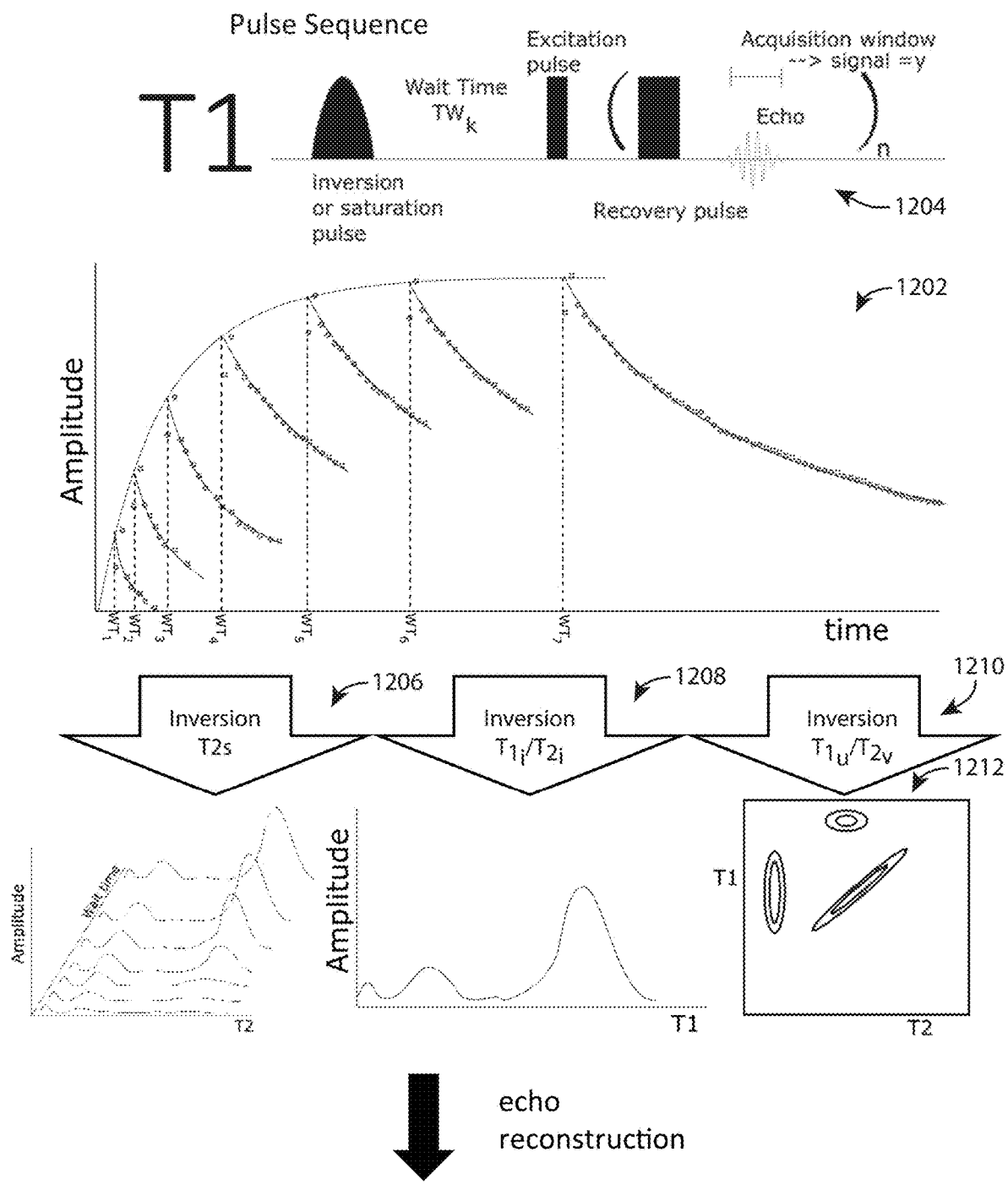
FIG. 12 is a chart illustrating $T_1$ inversions.
Figure 14:
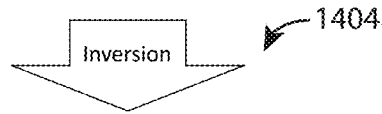
FIG. 14 is a chart illustrating a $T_1$ uphole inversion.
Figure 14:
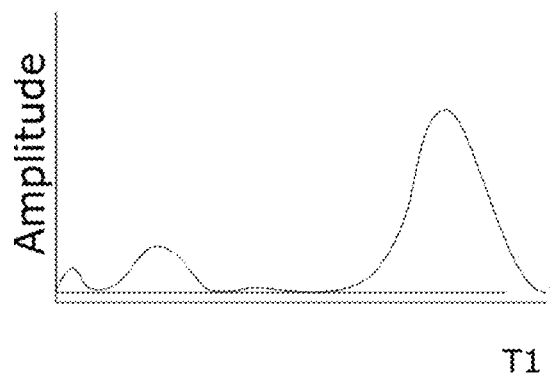
Figure 14:
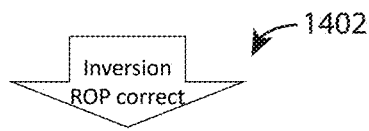
Figure 14:
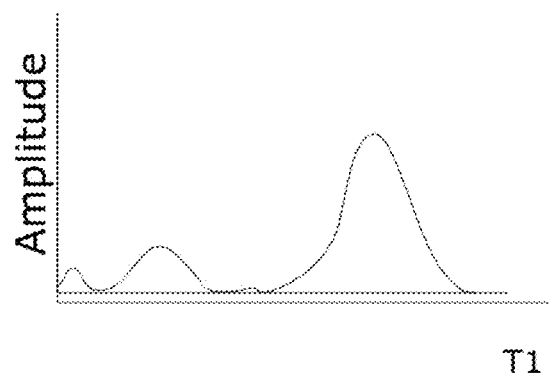
Figure 15:
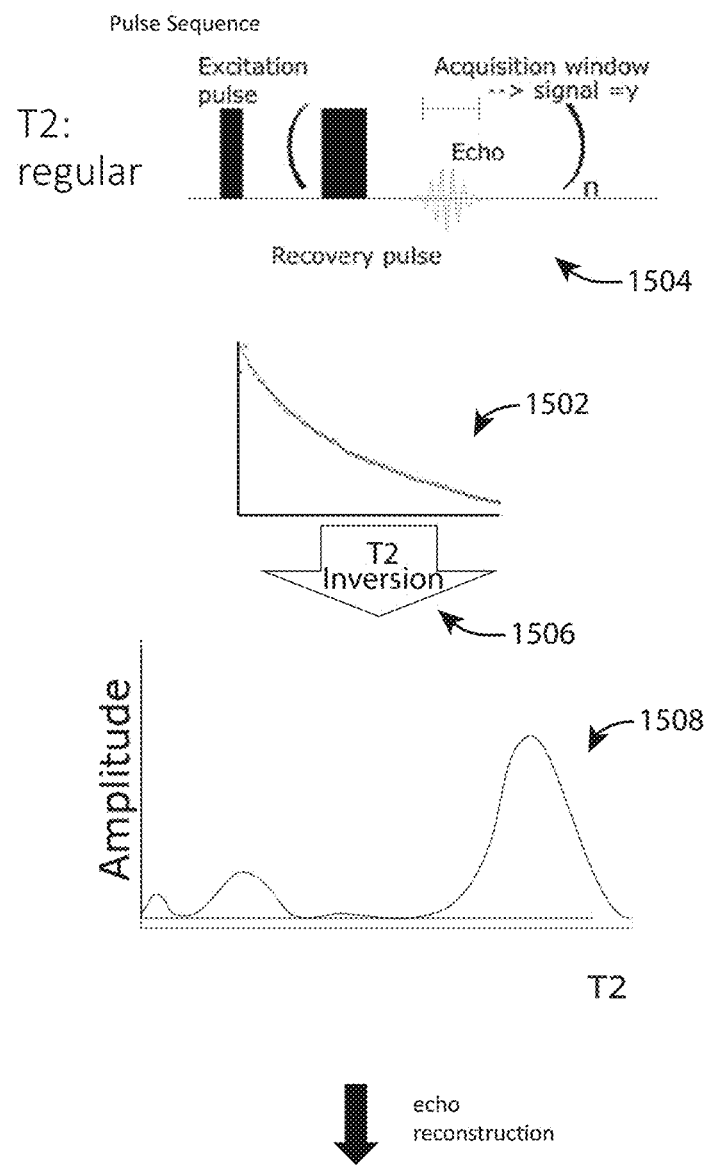
FIG. 15 is a chart illustrating inversion of $T_2$ data.
Figure 16:
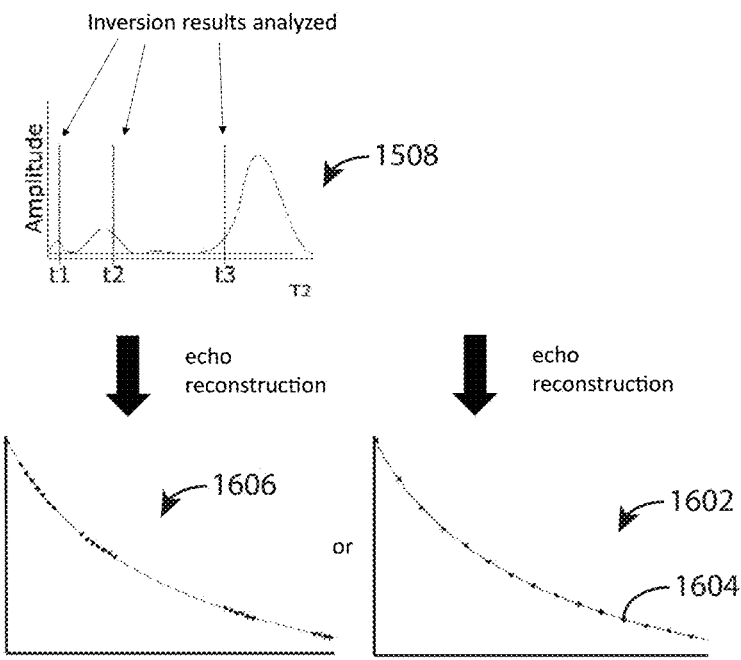
FIG. 16 is a chart illustrating two techniques for reconstructing $T_2$ curves.
Figure 17:
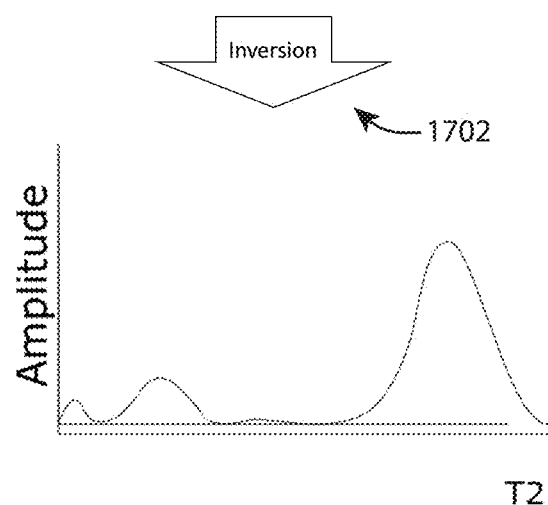
FIG. 17 is a chart illustrating a $T_2$ regular uphole inversion.
Figure 18:
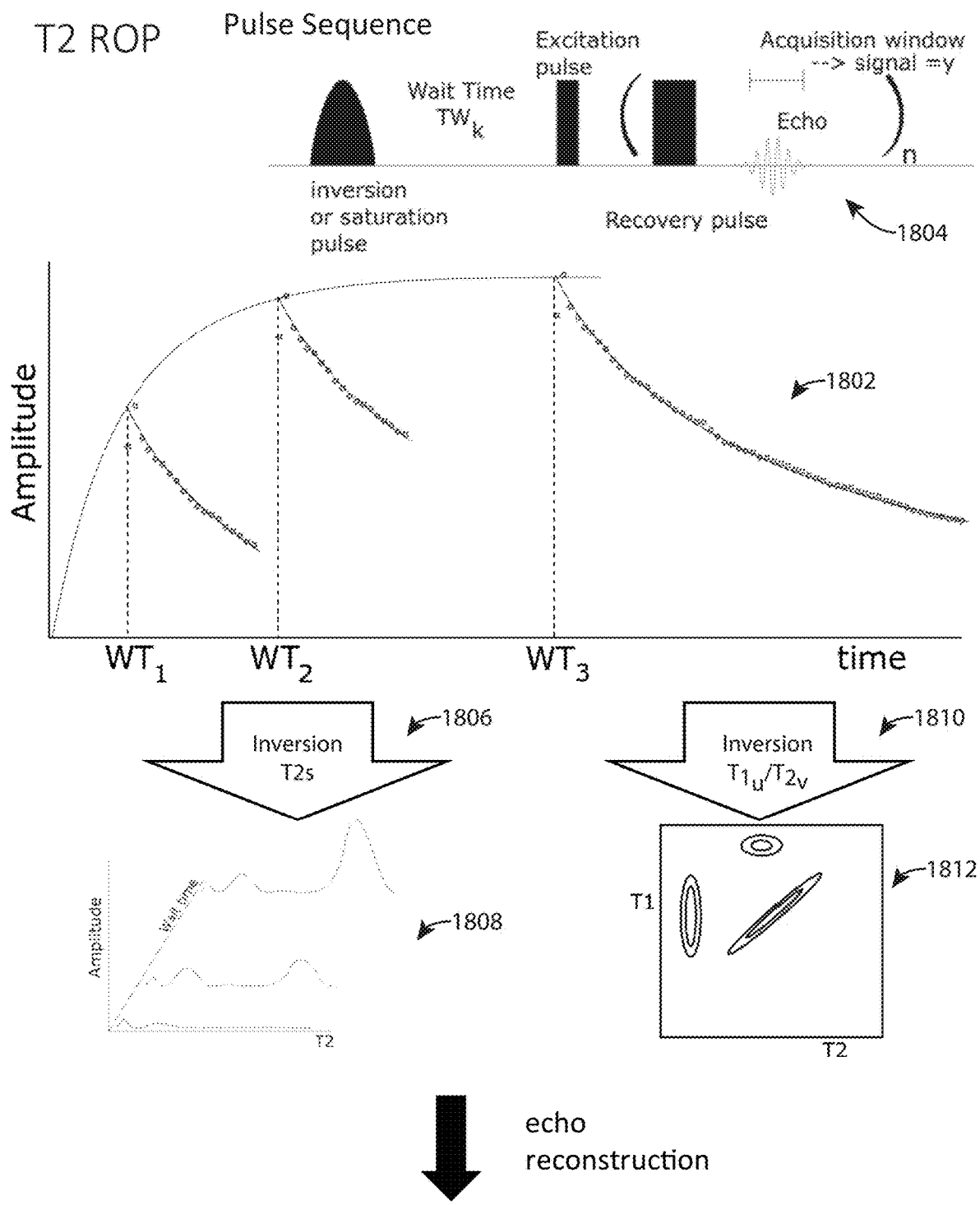
FIG. 18 is a chart illustrating inversions of $T_2$ data in an ROP-corrected scheme.
Figure 19:
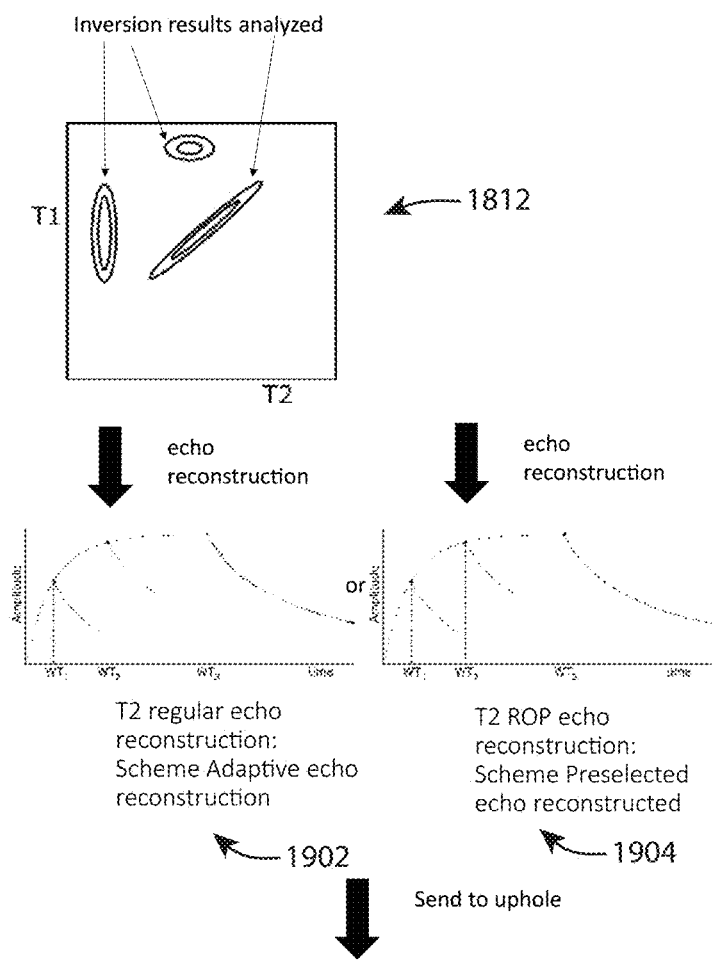
FIG. 19 is a chart illustrating reconstruction of $T_2$ echoes in an ROP-corrected scheme.
Figure 20:
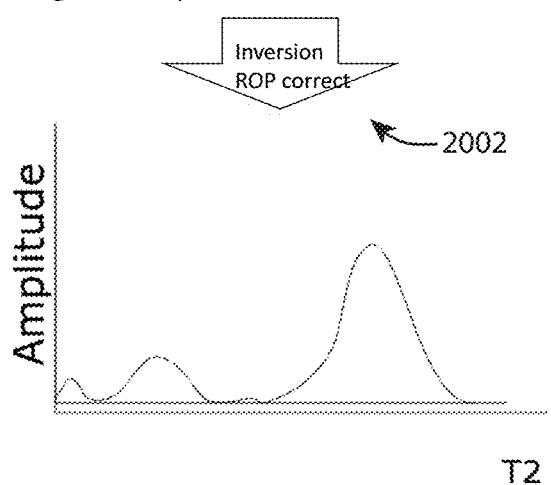
FIG. 20 is a chart illustrating a $T_2$ uphole inversion in an ROP-corrected scheme.

FIGS. 12, 13, and 14 illustrate the $T_1$ schemes. FIG. 12 is a chart illustrating $T_1$ inversions. FIG. 13 is a chart illustrating reconstruction of echoes and A0 from inverted T1 data. FIG. 14 is a chart illustrating a $T_1$ uphole inversion. FIGS. 15-20 illustrate the $T_2$ schemes. FIG. 15 is a chart illustrating inversion of $T_2$ data. FIG. 16 is a chart illustrating two techniques for reconstructing of $T_2$ curves. FIG. 17 is a chart illustrating a $T_2$ regular uphole inversion. FIG. 18 is a chart illustrating inversions of $T_2$ data in an ROP-corrected scheme. FIG. 19 is a chart illustrating reconstruction of $T_2$ echoes in an ROP-corrected scheme. FIG. 20 is a chart illustrating a $T_2$ uphole inversion in an ROP-corrected scheme.

First $T_1$ Scheme (1102)

In a first $T_1$ scheme 1102 (see FIG. 12): The NMR tool takes data 1202 using a $T_1$ sequence 1204. A $T_2$ inversion 1206 is performed on each WT in the $T_1$ data. The $T_2$ inversion determines the $x_i$ coefficients for the data for each wait time by using a basis function such as in equations (5B), (5C), or (5D) to create $A_{ij}{}^k$.

The A0 s are calculated and echoes are reconstructed for each reconstruction wait time using $T_2$ coefficients. For example, equation (5A) may be used to reconstruct the $T_2$ data. The A0 values are the values of the $T_2$ data at time=0 for each wait time.

The reconstructed data is sent uphole.

An uphole inversion (see FIG. 14) is done with (1402) or without (1404) ROP A(v)s. When the uphole inversion compensates for a rate-of-penetration (ROP) motion measured on an uphole portion of a drilling system the inversion can include an inversion matrix $A_{ij}(v)$ which has the motion effect calculated as shown above. An ROP observed at the surface, for example by measuring the rate a drilling string is proceeding into a well bore or by observing another parameter at the surface, may be to select the $A_{ij}{}^k(v)$ used in the second inversion.

The spectra are interpreted from the inversion.

Second $T_1$ Scheme (1104)

In a second $T_1$ scheme 1104 (see FIG. 12): The NMR tool takes data 1202 using a $T_1$ sequence 1204. A $T_{1j}/T_{2i}$ inversion 1208 is performed on the data 1202 to determine $x_i$ coefficients of the data by using a basis function such as equation (3). Alternatively, a $T_{1u}/T_{2v}$ inversion 1210 is performed on the data 1202 to determine $x_{ij}$ coefficients of the data by using a basis function such as equation (2). The result of the $T_{1u}/T_{2v}$ inversion 1210 is a "map" 1212 in which, for example, the x axis is the $T_{2v}$ time domain and the y axis is Tiu time domain, as shown in FIG. 12. The intensity of the map is the amplitude of the signal at those $T_{uv}$ bin spots. The $A_{uv}{}^k$ may be calculated on the fly downhole prior to the inversion or they could be preloaded. Further, the basis function for inversion is not limited to that of equation (5A). For instance, the basis function could be that of $A_{uv}{}^k(v)$ where the v is preselected before the data is taken, is loaded in the memory onto the tool, and is used to reconstruct the echoes.

The A0s are calculated and echoes are reconstructed for each wait time using $T_1$ coefficients, as illustrated in FIG. 13. The reconstructed data is sent uphole.

An uphole inversion (see FIG. 14) is done with 1402 or without 1404 ROP A(v)s. When the uphole inversion compensates for a rate-of-penetration (ROP) motion measured on an uphole portion of a drilling system the inversion can include an inversion matrix $A_{ij}(v)$ which has the motion effect calculated as shown above. An ROP observed at the surface, for example by measuring the rate a drilling string is proceeding into a well bore or by observing another parameter at the surface, may be to select the $A_{ij}{}^k(v)$ used in the second inversion.

The spectra are interpreted from the inversion.

First $T_2$ scheme (1106)

In a first $T_2$ scheme 1106 (see FIG. 15): The NMR tool takes data 1502 using a $T_2$ sequence 1504. A $T_2$ inversion 1506 is performed on the data 1504 to produce results 1508 of the first inversion, i.e., the $x_i$ coefficients.

The A0s are calculated and the echoes are reconstructed either with predetermined times or adaptively. FIG. 16 is a chart illustrating two techniques for reconstructing $T_2$ curves. A $T_2$ curve is reconstructed from the results 1508 of the first inversion of the stacked $T_2$ data 1506 by selecting the time position of the echoes being reconstructed. While the number of techniques for selecting the time positions is unlimited, there are two general schemes that can be followed. Both schemes can be expressed using equation (18).

In a first reconstruction scheme, represented by curve 1602, the times are preselected and the points 1604 (only one is labeled) are calculated for those preselected times. This scheme is likely to contain the A0 for the echo train. The spacing between echoes could be linear at multiples of TE (the inter-echo time, see FIG. 6). For example, every $4^{th}$ echo of the original train could be recalculated. The scheme could also be non-linear. For example, shorter $T_2$s have a fast drop off so more points may be selected early on and then fewer at later times to account for that.

In a second reconstruction scheme, represented by curve 1606, time positions of the reconstructed echoes are selected adaptively. Typically, the time positions include A0 (i.e., t=0) and a time at the end of the time when the data for the echo was received or from a time far enough out that the reconstructed echoes are unequivocally 0. One adaptive scheme uses concentrations of points, separated by, for example TE, around times where peaks appear in the spectrum created by the coefficients (i.e., times t1, t2, t3 . . . ) in the results 1508 of the first inversion 1506, as shown in curve 1606.

The reconstructed data is sent uphole. In the preselected times scheme, the timing information is already known by the uphole processor and is ready to be used for the uphole inversion. As such, only the reconstructed data need be transferred. In contrast, in the adaptive reconstruction scheme, information about the times of the echoes needs to be sent uphole along with the reconstructed data.

FIG. 17 is a chart illustrating a T2 regular uphole inversion. An uphole inversion 1702, shown in FIG. 17, is done on the reconstructed data without ROP correction. When the uphole inversion compensates for a rate-of-penetration (ROP) motion measured on an uphole portion of a drilling system the inversion can include an inversion matrix $A_{ij}(v)$ which has the motion effect calculated as shown above.

The spectra are interpreted from the inversion.

Second $T_2$ Scheme (1108)

FIG. 18 is a chart illustrating inversions of $T_2$ data in an ROP-corrected scheme. FIG. 19 is a chart illustrating reconstruction of $T_2$ echoes in an ROP-corrected scheme. In a second $T_2$ scheme 1108: The NMR tool takes $T_2$ data 1802 using a sequence 1804 with a number of wait times. The number of wait times could be as few as 1 and has no upper limit, but over 25 would be excessive in downhole conditions. FIG. 18 demonstrates a sequence with 3 wait times. The sequence in FIG. 18 has 1 longest wait time with a large number of echoes and 2 shorter wait times with fewer echoes than the one with the longest wait time. The wait times are not limited to be long or short in this sequence, but there is a sequence where all wait times for the $T_2$ ROP corrective scheme are greater than 0.1 seconds.

A $T_2$ inversion 1806, using one of equations (5B), (5C), or (5D), is performed on each WT in the data to produce a $T_2$ inversion result 1808 for each wait time. Alternatively, a $T_1/T_2$ inversion 1810 using, for example, one of equations (5E), is performed on the data to produce a $T_1/T_2$ inversion map 1812.

The A0s are calculated and the echoes are reconstructed for each wait time using $T_2$ coefficients 1808 or the $T_1/T_2$ inversion map 1812. The inversion data is processed to identify the times where the $T_2$ coefficients 1808 or $T_1/T_2$ inversion map 1812 shows the most intensity. The $T_1/T_2$ inversion map 1812 is then reconstructed using, for example, equation (15B), to produce the $T_2$ echo reconstruction 1902, which has greater density at the times where the $T_1/T_2$ inversion map 1812 shows the most intensity. Alternatively, the echo reconstruction 1904 could be produced using the $T_2$ coefficients 1808 or $T_1/T_2$ inversion map 1812 with for example, equation (15B), and preselected times.

The reconstructed data is sent uphole.

FIG. 20 is a chart illustrating a $T_2$ uphole inversion in an ROP-corrected scheme. An ROP-correct uphole inversion 2002 is performed on the reconstructed data, which is possible because the reconstructed data includes both $T_1$ and $T_2$ data. When the uphole inversion compensates for a rate-of-penetration (ROP) motion measured on an uphole portion of a drilling system the inversion can include an inversion matrix $A_{ij}(v)$ which has the motion effect calculated as shown above. An ROP observed at the surface, for example by measuring the rate a drilling string is proceeding into a well bore or by observing another parameter at the surface, may be used to select the $A_{ij}^{k}(v)$ used in the second inversion.

An ROP observed at the surface, for example by inverting data by an uphole processor to produce the lowest-error $A(v)$, may select the $A_{ij}^{k}(v)$ used in the second inversion.

The resulting data may then be inverted using the lowest-error $A(v)$ to produce the correct spectra.

The spectra are interpreted from the inversion.

In a different embodiment, the inversion downhole is done in such a way that there is enough bandwidth to send the inversion results $x_i$ uphole. This may limit the number of spectra results to for example under 20 points. The $x_1$ results are then used to reconstruct the data uphole using equation 15(A) or 15(B). The reconstructed data will undergo a second inversion with an ROP correct A. An ROP observed at the surface, for example by measuring the rate a drilling string is proceeding into a well bore or by observing another parameter at the surface, may be to select the $A_{ij}^{k}(v)$ used in the second inversion.

Adaptive Data Compression and Formatting

An adaptive data compression and formatting technique, described herein, further reduces the amount of bandwidth required. While this adaptive data compressing and formatting technique is partly described in the context of transmissions for NMR processing, the same technique can be applied to transmissions for other downhole tools. For NMR data, reconstructed data or inverted data are examples that may be transmitted.

Figure 21:
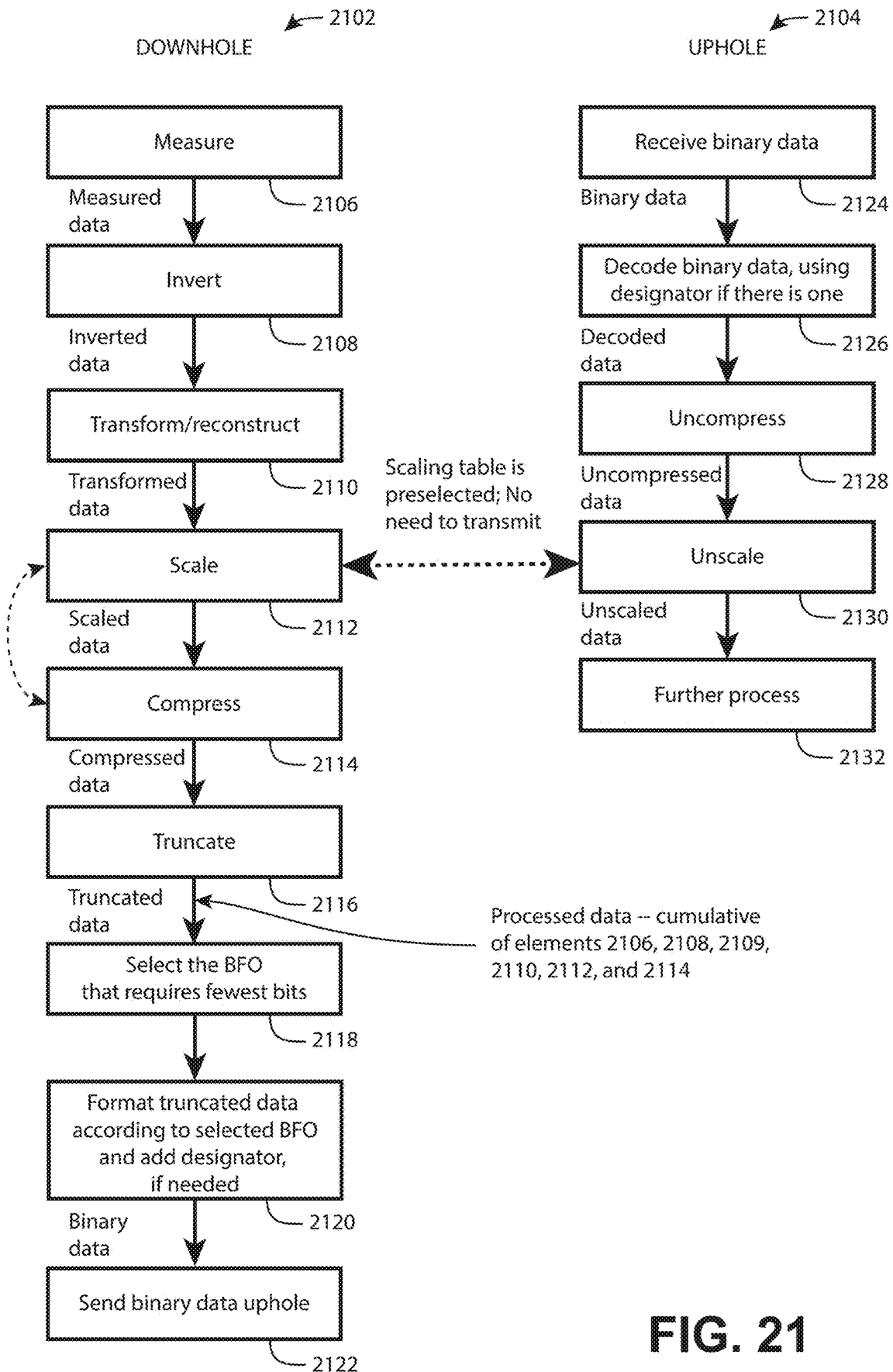
FIG. 21 illustrates a workflow that includes an adaptive data compression and formatting technique.

FIG. 21 illustrates a workflow that includes an adaptive data compression and formatting technique. Any of the elements illustrated in FIG. 21 can be used any number of times, including not at all. The workflow shown in FIG. 21 includes a downhole portion (2102) and an uphole portion (2104). Beginning with the downhole elements of the workflow, data is measured (2106) to produce measured data. In the NMR example described above, measured data may be T1 data 1202 in FIG. 12 or the T2 data 1502 in FIG. 15 or the $T_2$ data 1802 in FIG. 18. NMR measured data may be a combination of $T_1$ and $T_2$. NMR measured data may be the NMR free induction decay (FID) or waveform. NMR measured data may be the $T_{1\rho}$ of a locked spin state. NMR data may be processed to result in a spectrum in the diffusion domain, which is achieved by changing the time between recovery pulses, also known as the echo times, in subsequent $T_2$ sequences and doing an inversion with diffusion as one of the binning variables.

The measured data is then inverted (2108) to produce inverted data. In the NMR example described above, the inversions may include the inversions 1206, 1208, 1210 in FIG. 12, the inversion 1506 in FIG. 15, and the inversions 1806 and 1810 in FIG. 18. Other NMR measured data or measured data from other instruments may undergo different processing than inversion, such as a Fourier transform.

The inverted data is then transformed or reconstructed (2110) to produce transformed data. In the NMR example, the transformation may include the echo reconstructions in FIG. 13, the echo reconstructions in FIG. 16, and the echo reconstructions in FIG. 19. As discussed above, the echo reconstructions in FIGS. 13, 16, and 19 may be performed downhole or they may be performed uphole.

The transformed data is then scaled (2112) to produce scaled data. The purpose of scaling is to preserve the resolution of the transformed data for transmission uphole. As an example, assume that the transformed data has a value of 3.25. Typically, because the bandwidth for transmitting floating point numbers is not available, information is transmitted in integer form, meaning that, for example, the 3.25 value will either be rounded down to a value of 3 or rounded up to a value of 4.

In this example, one way to preserve the resolution of the 3.25 value is to multiply the value by a scalar. In the example, a good choice for the scalar is 4 so that the result of the multiplication is 3.25×4=13, which is a number that can be represented in an integer format. That number is transmitted to the surface and divided by the same scalar (e.g., 4 in the example) resulting in 3.25, thereby preserving the resolution of the measured data. The scaling may be done with a scaling table as discussed below in connection with the discussion of Tables 6 and 7 and FIG. 22.

The scaled data is then compressed (2114), using, for example, a compression technique such as delta compression. It will be understood that other compression techniques may be used.

Compression (2114) and scaling (2112) are communitive. That is, instead of performing scaling (2112) first as shown in FIG. 21, compression (2114) may be performed first. In some other example, perhaps not dealing with NMR, other elements of FIG. 21 may also be communitive.

The compressed data is then truncated 2116 to fit an integer data scheme, producing truncated data. That is, even after scaling, the scaled data may have a non-integer form (such as "12.01"). In that case, the information after the decimal point is truncated to allow the truncated data to be treated as an integer. The data that is cumulative of all the elements of measuring (2106), inverting (2108), transforming/reconstructing (2110), scaling (2112), compressing (2114), and truncating (2116) is also referred to as "processed data."

The processed data is then analyzed to select a binary format option (BFO) from among a plurality of BFOs in a binary format option selection table (BFOST) that requires the fewest number of bits (2118). As will be seen, each BFO is made up of a set of "fields" that contain the binary data to be transmitted uphole. The BFOSTs and BFOs are described below in connection with Tables 1-5 and the process for selecting the BFO to apply is described below in connection with FIG. 22. A single BFOST may be loaded onto the tool, such as the NMR tool, before deploying the tool in the borehole. Alternatively, two or more BFOSTs may be loaded onto the tool and the BFOST to be used with element (2118) may be selected downhole based on the type of compression being used, an analysis of the truncated data, or some other criteria, and an identification of the selected BFOST may be sent uphole.

The processed data is then formatted according to the selected BFO and a designator is added, if needed (2120), as discussed below, to produce binary data. The binary data is sent uphole (2122).

On the uphole portion 2104 of the workflow, the binary data is received 2124. The binary data is decoded from binary, using the designator (discussed below in connection with Tables 2-5) if one is provided 2126, to produce decoded data. The decoded data is uncompressed 2128 to produce uncompressed data and unscaled 2130 to produce unscaled data (reversing the order that the data was scaled 2112 and compressed 2114). Further processing is performed 2132 on the unscaled data. In the NMR example described above, the further processing may include echo reconstruction in FIGS. 13, 16, and 19, uphole inversion 1404 in FIGS. 14 and 1702 in FIG. 17, or ROP-corrected uphole inversion 1402 in FIGS. 14 and 2002 in FIG. 20.

To explain the purpose of compression (2114), a brief background is provided. Raw data collected by downhole sensors (or any sensor for that matter) includes both the desired signal and undesirable, but unavoidable, collected noise, which is a general term intended to encompass noise from the sensor itself, noise from the environment, and noise generated by other tools or equipment. The ratio between signal and noise may be referred to as the signal-to-noise ratio (or "SNR"). SNR often dictates the resolution of the end result that may be achieved. For example, a SNR of 10 may allow a resolution of 1 foot while an SNR of 9 may result in a resolution of 1.23 feet, assuming collection conditions are the same.

Reducing the amount of information to be telemetered from the downhole tool by compression adds additional noise, called "compression noise," that reduces the SNR. For example, in "lossy compression," some information contained in the raw data is lost. As such, there is a tradeoff between information quality, represented by the SNR, and bandwidth requirements, i.e., the amount of the information sent uphole.

Keeping the compression noise to less than or equal to one-third of the collected noise, or a degradation of SNR by less than 10 percent due to compression, has been found to be acceptable.

As discussed above, the processed data is formatted into binary data for transmission uphole. An example of a data compression and formatting technique that may produce such compression noise is an adaptive data compression and formatting technique, illustrated in connection with Tables 1-5 below, that selects the BFO to be used (i.e., element (2118) in FIG. 21) based, for example, on the maximum value and incremental values of information to be formatted. With an NMR tool, for example, the BFO selection may include selecting a BFO based on the shape of the information to be compressed. For example, with a CPMG curve, such as that illustrated in FIG. 6, the curve has a maximum value (A0) that tails off with time, so it may make sense to use a BFO that allows for large values for earlier times and smaller values for later time. In contrast, the $T_1$ experiment illustrated in FIG. 7 has the opposite shape. The values are smaller for early wait times and become progressively larger for later wait times, so that it may make sense to use a BFO that allows for small values for early times and large values for later times. Note once again that, while NMR tools are used as examples to explain the concepts of this disclosure, the techniques described herein can be used with other downhole tools or in any situation where the tradeoff between information bandwidth and information quality is present. Note also that it is possible for the adaptive data compression and formatting technique to produce no compression noise if the truncated data fits into the selected BFO without modification.

Table 1 shows the range of information that can be represented for respective numbers of bits. That is, with 3 bits, information ranging from 0 through 7 (i.e., 0, 1, 2, 3, 4, 5, 6, 7) can be efficiently represented; with 4 bits, information ranging from 0 through 15 can be represented (information smaller than 8 are more efficiently represented with 3 bits and information greater than 15 cannot be represented with 4 bits); with 5 bits, information ranging from 0 through 31 can be represented (information smaller than 16 are more efficiently represented with 3 or 4 bits and information greater than 31 cannot be represented with 5 bits); and with 6 bits, information ranging from 0 through 63 can be represented (information smaller than 31 are more efficiently represented with 3, 4, or 5 bits and information greater than 63 cannot be represented with 6 bits). Generally, with n bits, values from 0 through $2^n-1$ can be represented.

TABLE 1

| Number of bits needed | Range of processed information |
| --- | --- |
| 3 | [0, 7] |
| 4 | [0, 15] |
| 5 | [0, 31] |
| 6 | [0, 63] |

Conventionally, in NMR tools, the information that might be sent uphole is the X coefficients. The number of X coefficients to be sent is a tradeoff between the number of bits it will require to send the data and the targeted certainty of the data. A practical number of X coefficients to send is around 12. In this conventional scheme, the minimum number of bits that might cover all X coefficients is 4 bits per coefficient. Each coefficient is scaled to be 0 to 15. Additionally, the total porosity is also sent uphole at 8 bits. This results in a total of 56 bits used. The conventional concepts are illustrated with an example of sending the spectrum from 12-coefficients. This spectrum is referred to as the 12-bin-spectrum. The 12-bin-spectrum uses 4 bits for each of the 12 numbers, which are scaled. This means the maximum number any scaled coefficient can have is limited to 15 before hitting the maximal porosity ceiling. When total porosity is 15 porosity units (PU) or above, the worst case (there is only 1 non-zero bin) resolution in bin values is 1 PU or more, which is too coarse.

The scheme just described can either limit the functionality of the information being sent up, by hitting a porosity ceiling, or waste precious bits to send up small numbers that require less than 4 bits.

For some X coefficients, 4 bits is not ideal. It would be better if the number of bits could be dynamically selected for each item of information to be sent uphole such as by matching the number of bits to the value of the item of information to be being sent in Table 1. But if that were done, there would need to be a way for the uphole system receiving the data to tell how many bits were used for each item of information. Otherwise, it would be impossible to identify in the stream of data the boundaries between the items of information.

To allow for adaptively selecting a BFO based on the downhole processed data (i.e., the processed data output from element 2114) different BFOs are available for encoding. The BFO that was used downhole may be identified uphole by the total number of bits used or by using a designator. Each BFO may have a designator which indicates which BFO was used. Either the first bits or the last bits are designated to identify which BFO was used, although any bits in the stream may be used. If there are 2 BFOs, only 1 bit is needed for the designator (i.e., if the designator is binary 0, BFO 1 is used; if the designator is binary 1, BFO 2 is used). If there are 4 BFOs, then 2 bits are needed for the designator (i.e., if the designator is binary 00, BFO 1 is used; if the designator is binary 01, BFO 2 is used; if the designator is binary 10, BFO 3 is used; and if the designator is binary 11, BFO 4 is used). If there are 8 BFOs, then 3 bits are needed for the designator (i.e., if the designator is binary 000, BFO 1 is used; if the designator is binary 001, BFO 2 is used; if the designator is binary 010, BFO 3 is used; if the designator is binary 011, BFO 4 is used; if the designator is binary 100, BFO 5 is used; if the designator is binary 101, BFO 6 is used; if the designator is binary 110, BFO 7 is used; if the designator is binary 111, BFO 8 is used), etc.

Table 2 is an example of a BFOST having 8 BFOs that might be selected for the 12 bins in an NMR tool reporting total porosity (similar tables can be derived for other downhole tools). As can be seen, each BFO in the BFOST shown in Table 2 includes a "Total Porosity" field, a "Designator" field, and 12 "bin" fields, numbered 1 to 12.

TABLE 2

| | Total Porosity | Designator | Bin positions | | | | | | | | | | | | Total |
| --- | --- | --- | --- | --- | --- | --- | --- | --- | --- | --- | --- | --- | --- | --- | --- |
| | | | 1 | 2 | 3 | 4 | 5 | 6 | 7 | 8 | 9 | 10 | 11 | 12 | |
| BFO 1 | 6 | 3 | 2 | 2 | 2 | 2 | 2 | 2 | 3 | 3 | 3 | 3 | 3 | 3 | 41 |
| BFO 2 | 6 | 3 | 2 | 2 | 2 | 2 | 2 | 3 | 3 | 4 | 4 | 3 | 3 | 3 | 43 |
| BFO 3 | 6 | 3 | 3 | 3 | 3 | 3 | 3 | 3 | 3 | 3 | 3 | 3 | 3 | 3 | 47 |
| BFO 4 | 7 | 3 | 3 | 3 | 3 | 3 | 3 | 3 | 3 | 4 | 4 | 4 | 4 | 3 | 51 |
| BFO 5 | 7 | 3 | 3 | 3 | 3 | 3 | 3 | 3 | 4 | 4 | 4 | 4 | 3 | 3 | 52 |
| BFO 6 | 7 | 3 | 3 | 3 | 3 | 3 | 4 | 4 | 4 | 4 | 4 | 4 | 3 | 3 | 54 |
| BFO 7 | 7 | 3 | 3 | 3 | 3 | 3 | 3 | 3 | 3 | 5 | 5 | 5 | 4 | 3 | 54 |
| BFO 8 | 8 | 3 | 4 | 4 | 4 | 4 | 4 | 4 | 4 | 4 | 4 | 4 | 4 | 4 | 59 |

Each "bin" column in Table 2 includes the number of bits devoted to sending the value of the processed data for that bin position. The Total column includes the sum of the number of bits in the 12 bin columns, the number of bits in the designator column, and the 8 bits used to report total porosity. For example, for BFO 1, the total=sum of bits in bin columns (2+2+2+2+2+2+3+3+3+3+3+3=30)+bits in designator column (3)+bits used to report total porosity (8)=41.

As can be seen in Table 2, the number of bits needed to send the total porosity decreases as the total porosity decreases. That is, 8 bits are required for porosity for BFO 8, 7 bits are required for porosity for BFOs 5-7, and 6 bits are required for porosity for BFOs 1-3. In this example, three bits are needed, again either as the first 3 bits or last three bits, or any designated placement for them in the sequence of bits, to designate which BFO is being used. The first bins for the example BFOST shown in Table 2 are for the shorter $T_1$ or $T_2$ times, however a BFOST where the shorter $T_1$ or $T_2$ times are the last bins could also be done. The porosity in these bins tends to be smaller so fewer bits are likely needed than 4. Every BFO aside from BFO 8 requires fewer than 54 bits, which was the original number of bits needed if 4 bits are dedicated to each bin. BFO 8 is the 4-bits-per-bin conventional scheme, but it still requires the designator, which forces the number of bits for that BFO to be higher. In general, if the BFOs are designed well, the number of bits being used overall will be lower on average.

BFO 8 is not expected to be used very often statistically, since porosity is not high for most of depths during drilling. Even though BFO 8 is the worst in terms of the number of bits required, the required overall bandwidth is expected to be less than the original example, where the 12-bin-spectrum is sent for 56 bits, the average number of bits being sent in a run over time for the tool using the adaptive data formatting technique will be lower. Such improvement gives the user (e.g., a driller) more flexibility in trading the amount of bandwidth allocated to the NMR tool, for example, against the usage from other tools.

The formatting illustrated in Table 2 may be further improved if delta compression is used in the compression element (2114), as discussed below.

Compression (i.e., element 2114) can be performed in many different manners. An inversion, such as the inversion (2108) in FIG. 21, which takes hundreds of echoes and transforms them into a different time domain ($T_1$ or $T_2$ or both) with less number of data values where the same answers are given (for example, micro porosity, meso porosity, macro porosity) is a manner of compression. As per above, the raw data, the hundreds of echoes, have become spectral coefficients. The compression is not limited to a single step. For every additional step of compression after the data inversion the received information uphole needs to be uncompressed. Consider for example, processing for a downhole NMR tool using a "split inversion" method in which one inversion is done downhole and a second inversion is done uphole, as described in U.S. patent application Ser. No. 16/595,022, entitled "Reducing Data Bandwidth Requirements in Downhole Nuclear Magnetic Resonance Processing," filed on Oct. 7, 2019, and as described above.

The split inversion method reduces the number of data points being sent uphole to the number of wait times reconstructed if reconstruction is performed downhole. The split inversion method allows for fewer points than the inversion results to be sent. For example, the spectrum could be sent in 12 coefficients, however, the split inversion could be sent in 8 or 10 reconstructed echo values. The split inversion compression method has added benefits during decompression (the uphole inversion) of having more than the example number of 12 bins and thus having more spectrum coefficients for final analysis, which is all done uphole. The adaptive data compression and formatting technique reduces the number of bits required to send that data. The compression steps are not limited to those described here or shown in FIG. 21. As such, after the reconstructed echoes are calculated downhole for split inversion, delta compression can be used to further reduce the number of bits being used.

Any element in the adaptive data compression and formatting technique illustrated in FIG. 21 can be repeated or eliminated depending on the tool and data type. For example, consider the split inversion scheme where scaling (2110) is eliminated. A BFOST having 4 BFOs is illustrated in Table 3 below. Each BFO in the BFOST defines a binary format for the binary data to be sent uphole. In the BFOST shown in Table 3, the need for the total porosity is eliminated by sending the scale-free actual values of the A0s, as discussed above in connection with FIG. 13 (the T1 Echo reconstruction: Type A0 only). Only 4 different BFOs are used as an example for simplicity, although it will be understood that a greater number or a smaller number of BFOs could be defined and used. In the BFOST shown in Table 3, the total number of bits needed is consistently under 54 bits. In other words, in all cases the bandwidth required is superior to the 12-bin-spectrum equivalent. As previously mentioned, while this example is for an NMR tool, the same or similar compression schemes could also be used with other types of tools and other types of information. Note that in Tables 3, 4 and 6 (described below), the "Range" column indicates the range of maximum values that can be included in each bit position to be transmitted uphole and is typically the processed data after inversion, transformation/reconstruction, compression, scaling, and truncation as described above. That is, in the BFOST shown in Table 3, BFO 1 allows the maximum A0 value to be any value from 0-7, BFO 2 allows the maximum A0 value to be any value from 8 to 15 (maximum values smaller than 8 could be represented but doing so would be inefficient), BFO 3 allows the maximum A0 value to be any value from 16 to 31 (maximum values smaller than 16 could be represented but doing so would be inefficient), and BFO 4 allows the maximum A0 value to be any value from 32 to 63 (maximum values smaller than 32 could be represented but doing so would be inefficient). In Table 3, all WTs (each A0 is associated with a WT) are allocated the same number of bits so that each bin may carry data having the maximum value in the Range column.

TABLE 3

|  | Range | Designator | A0 #1 | A0 #2 | A0 #3 | A0 #4 | A0 #5 | A0 #6 | A0 #7 | A0 #8 | Total |
| --- | --- | --- | --- | --- | --- | --- | --- | --- | --- | --- | --- |
| BFO 1 | [0, 7] | 2 | 3 | 3 | 3 | 3 | 3 | 3 | 3 | 3 | 26 |
| BFO 2 | [8, 15] | 2 | 4 | 4 | 4 | 4 | 4 | 4 | 4 | 4 | 34 |
| BFO 3 | [16, 31] | 2 | 5 | 5 | 5 | 5 | 5 | 5 | 5 | 5 | 42 |
| BFO 4 | [32, 63] | 2 | 6 | 6 | 6 | 6 | 6 | 6 | 6 | 6 | 50 |

However, other compression schemes and binary data formatting schemes may reduce the number of bits even further. For example, processed data compressed using a delta compression scheme, in which the difference between the A0s instead of the actual A0s is to be transmitted uphole, may be changed to binary (2120) using one of the 4 BFOs in the BFOST shown in Table 4 (again, it will be understood that the number of BFOs in the BFOST may be greater than or less than the 4 BFOs shown in Table 4). Since the A0 curve is a build-up curve such as that shown in the T1 Echo reconstruction: Type A0 only curve in FIG. 13, the difference between the consecutive AOs is likely less than the porosity value itself, especially for the later WTs. This means a very small number of bits can be used for many of the entries. The BFOST for such delta compression is illustrated in Table 4 below. As can be seen each BFO in the BFOST shown in Table 4 includes a "Range" field, a "Designator" field, and 8 delta value bin fields ("A8", "A8-A7", "A7-A6", "A6-A5", "A5-A4", "A4-A3", "A3-A2", and "A2-A1") As with the BFOST shown in Table 3, the Range column indicates the range of maximum values that can be efficiently handled by each BFO. Note that in Table 4, unlike Table 3, not all of the bins can carry data having the maximum value in the Range column. For example, in BFO 1, the first and second bins have 3 bits and can carry the maximum value of the Range column (7). The other bins have fewer bits and cannot carry the full range of values shown in the Range column.

mined to have the range [0,7] (i.e., 0 to 7 inclusive), and the BFO allocates 3 or fewer bits to each difference. That is:

3 bits are allocated to A8 (i.e., A0 #8),
3 bits are allocated to A8-A7 (i.e., A0 #8-A0 #7),
2 bits are allocated to A7-A6 (i.e., A0 #7-A0 #6),
2 bits are allocated to A6-A5 (i.e., A0 #6-A0 #5),
2 bits are allocated to A5-A4 (i.e., A0 #5-A0 #4),
1 bit is allocated to A4-A3 (i.e., A0 #4-A0 #3),
1 bit is allocated to A3-A2 (i.e., A0 #3-A0 #2), and
1 bit is allocated to A2-A1 (i.e., A0 #4-A0 #3).

Multiple BFOSTs can be combined using multiple designators. For example, the BFOSTs of Tables 3 and 4 may be combined as shown in the BFOST shown in Table 5 below. Each BFO in the BFOST shown in Table 5 has a "Designator 1" field, a "Designator 2" field, and 8 bin fields. In this case, the total porosity may be used to determine which of options 1-4 will be selected. Then, each A0 delta is checked to determine if it is small enough to capture with the smaller number of bits, in which case the A0 deltas can be sent using one of the option "b" BFO types (i.e., BFO 1b, BFO 2b, BFO 3b, or BFO 4b), similar to the BFOST illustrated in Table 4. If not, then each A0 can be sent using one of the "a" BFO types (BFO 1a, BFO 2a, BFO 3a, or BFO 4a), similar to the BFOST illustrated in Table 3.

TABLE 5

| | Designator 1 | Designator 2 | A0 #1 | A0 #2 | A0 #3 | A0 #4 | A0 #5 | A0 #6 | A0 #7 | A0 #8 | Total |
|---|---|---|---|---|---|---|---|---|---|---|---|
| BFO 1a | 2 | 1 | 3 | 3 | 3 | 3 | 3 | 3 | 3 | 3 | 27 |
| BFO 1b | 2 | 1 | 3 | 3 | 2 | 2 | 2 | 1 | 1 | 1 | 18 |
| BFO 2a | 2 | 1 | 4 | 4 | 4 | 4 | 4 | 4 | 4 | 4 | 35 |
| BFO 2b | 2 | 1 | 4 | 3 | 3 | 3 | 2 | 2 | 1 | 1 | 22 |
| BFO 3a | 2 | 1 | 5 | 5 | 5 | 5 | 5 | 5 | 5 | 5 | 43 |
| BFO 3b | 2 | 1 | 5 | 4 | 3 | 3 | 2 | 2 | 1 | 1 | 24 |
| BFO 4a | 2 | 1 | 6 | 6 | 6 | 6 | 6 | 6 | 6 | 6 | 51 |
| BFO 4b | 2 | 1 | 6 | 5 | 4 | 3 | 2 | 2 | 2 | 1 | 28 |

TABLE 4

| | Range of Δs | Designator | [A8 A8-A7 A7-A6 A6-A5 A5-A4 A4-A3 A3-A2 A2-A1] | Total Bits |
|---|---|---|---|---|
| BFO 1 | [0, 7] | 2 | [3 3 2 2 2 1 1 1] | 17 |
| BFO 2 | [8, 15] | 2 | [4 3 3 3 2 2 1 1] | 18 |
| BFO 3 | [16, 31] | 2 | [5 4 3 3 2 2 1 1] | 23 |
| BFO 4 | [32, 63] | 2 | [6 5 4 4 3 2 2 1] | 29 |

In delta compression, the degree of compression is greater, and the number of bits required to represent the processed data is smaller, if the range of differences (i.e., the Δs in Table 4) is smaller. For example, in BFO 1 in the BFOST shown in Table 4 the range of differences is deter- The BFOSTs and BFOs presented herein are not intended to be limiting but are merely examples. For example, the BFOST for delta compression illustrated in Table 4 might not be suitable for some extreme cases, where the error of data exceeds 0.5 PU after sending uphole. To cover all the cases including some extreme cases, one more bit can be added to the designator. This one bit can show whether the BFOs in Table 3 are used or the BFOs in Table 4 are chosen. That is, if the BFOs in Table 4 cannot maintain the precision of the data within 0.5 PU, then the BFOs in Table 3 will be used.

Scaling with a Scaling Table

Scalars used in scaling (2112) and un-scaling (2130) may be represented in a table in which there may be a scalar for each entry in the BFOST, as shown in the following example. Consider the BFOST with 4 BFOs shown in Table 6:

TABLE 6

|  | Range | Designator | A0 #1 | A0 #2 | A0 #3 | A0 #4 | A0 #5 | A0 #6 | A0 #7 | A0 #8 | Total |
|---|---|---|---|---|---|---|---|---|---|---|---|
| BFO 1 | [0, 7] | 2 | 3 | 3 | 2 | 2 | 2 | 2 | 2 | 4 | 22 |
| BFO 2 | [8, 15] | 2 | 4 | 4 | 4 | 3 | 2 | 2 | 2 | 3 | 26 |
| BFO 3 | [16, 31] | 2 | 6 | 5 | 4 | 3 | 2 | 2 | 2 | 4 | 30 |
| BFO 4 | [32, 63] | 2 | 7 | 5 | 5 | 5 | 5 | 5 | 6 | 7 | 47 |

Such a BFOST may be associated with a scalar table such as is illustrated in Table 7:

TABLE 7

|  | Scalar #1 | Scalar #2 | Scalar #3 | Scalar #4 | Scalar #5 | Scalar #6 | Scalar #7 | Scalar #8 |
|---|---|---|---|---|---|---|---|---|
| BFO 1 | 3.5 | 2.88 | 1.33 | 1.61 | 2.96 | 4.99 | 5.21 | 7.52 |
| BFO 2 | 2.14 | 2.88 | 3.39 | 2.02 | 1.75 | 2.94 | 4.73 | 4.42 |
| BFO 3 | 3.71 | 4.33 | 4.94 | 4.32 | 3.75 | 5.44 | 5.47 | 9.55 |
| BFO 4 | 2.66 | 1.24 | 1.36 | 1.24 | 1.37 | 1.3 | 3.21 | 2.29 |

In this example, the A0 value in the BFOST of Table 6 is multiplied by the scalar value in the corresponding cell of the scalar table of Table 6. For example, the value in BFO 1, A0 #1 is multiplied by scalar #1 for BFO 1 in Table 7, or "3.5."

The system may include as many scalar tables as there are BFOSTs. For example, if the system includes 5 BFOSTs, the system also includes 5 scalar tables. The scalar tables may be assigned to respective BFOSTs.

Further, the BFOSTs and respective scalar tables may be loaded onto the downhole tool before the downhole tool is sent into the well and the correspondence between the BFOSTs and the respective scalar tables may be known uphole and downhole. As such, it is not necessary to transmit the scalar table uphole as the designator will also indicate the scaling table used to scale the data.

Figure 22:
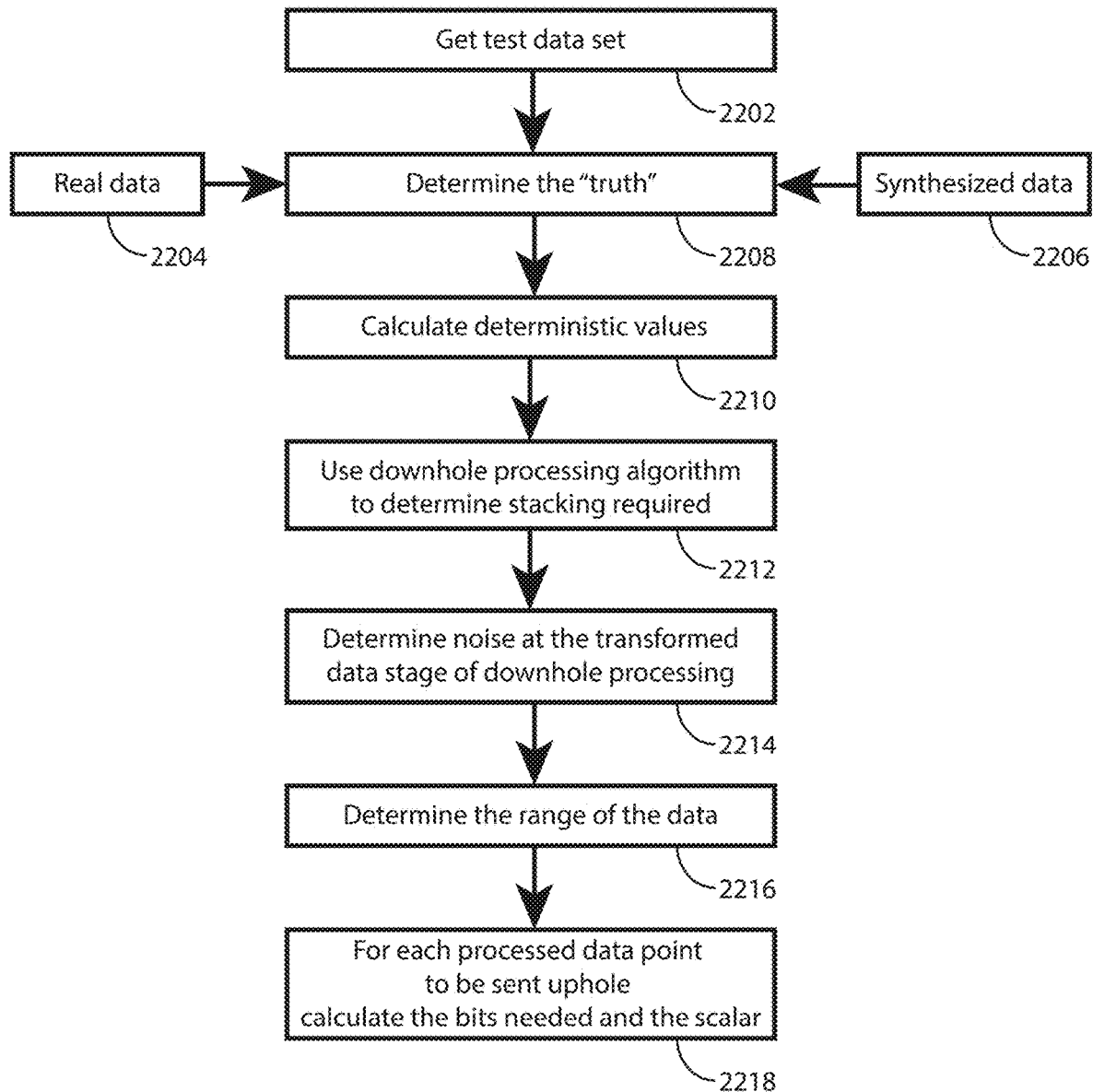
FIG. 22 is a flow chart illustrating a derivation of a scalar table.

FIG. 22 is a flow chart illustrating a determination of the number of bits required for each value to be sent uphole and a scalar for each value (i.e., block 2120) in FIG. 21. The process, which is done uphole before the tool is sent downhole, begins by acquiring a test data set (2202), which may be real data (2204) or synthetic data (2206). Real data (2204) is collected in the field by a tool acquiring data and then reading the data from the memory of a tool. In the NMR example, real data may be processed with an uphole inversion such as those illustrated in FIGS. 14, 17, and 20. ROP-corrected inversions are used if appropriate. Synthetic data (2206) is, as its name implies, synthetic. For example, in an NMR example, an example spectrum may be chosen from among possible spectra that have been determined and saved in the past or one which has porosity in targeted $T_1$ or $T_2$ times, then an echo train can be created, using the method for echo recreation, and then noise may be added to the echo train. Noise may be added to the same synthetic echo train many times over, for example 100 times, in order to make a set of synthetic echo trains. For real data, inverted results of the test data set, i.e., the real data (2204) is designated to be the "truth" (2208). For synthetic data the synthetic data (2206), the example spectrum chosen from among possible spectra or one which has porosity in targeted $T_1$ or $T_2$ times, is designated to be the "truth" (2208).

Deterministic values are then calculated (2210). Deterministic values may be a subset of processed results, e.g. micro porosity, meso porosity, macro porosity, total porosity, about which users care most. For example, in NMR, these values may be macro, meso, micro, and total porosity or for an NMR split inversion these values might be the reconstructed A0s.

A downhole processing algorithm may then be used to determine the stacking required to reach a goal SNR (2212). For example, in NMR, uphole software may use more than 1 stacked phase alternated pairs for processing. In the split inversion example described above, the goal is to use the reconstructed echoes, delta compression, scaling, and truncation, also known as the processed data from the first inversion downhole to produce statistically similar results from the uphole processing.

The noise at the transformed data stage of downhole processing (i.e., after stacking) is then determined (2214). For example, in the NMR split inversion described above, the noise determined would be the noise on the A0s and the delta A0s, which may be the fitting error, which can be calculated using a standard deviation of the resulting values for those quantities, for example.

The range of the data is then determined (2216). For example, in the delta compression scheme for NMR illustrated in Table 4 above, the ranges may be determined as follows:

Range:A8=Max({set of A8s})−Min({set of A8s}),
Range:A8-A7=Max({set of A8-A7})−Min({set of A8-A7}),
Range:A7-A6=Max({set of A7-A6})−Min({set of A7-A6}),
etc.

The bits needed and the scalar for each processed data point to be sent uphole are then calculated as follows:

$$\text{Bits needed} = \text{ceiling}\left[\log_2 \frac{\text{Range}}{\text{noise}}\right] \quad (22)$$

$$\text{scalar} = \frac{2^{\text{Bits needed}} - 1}{\text{Range}} \quad (23)$$

Selecting the Binary Formatting Option (BFO)

Figure 23:
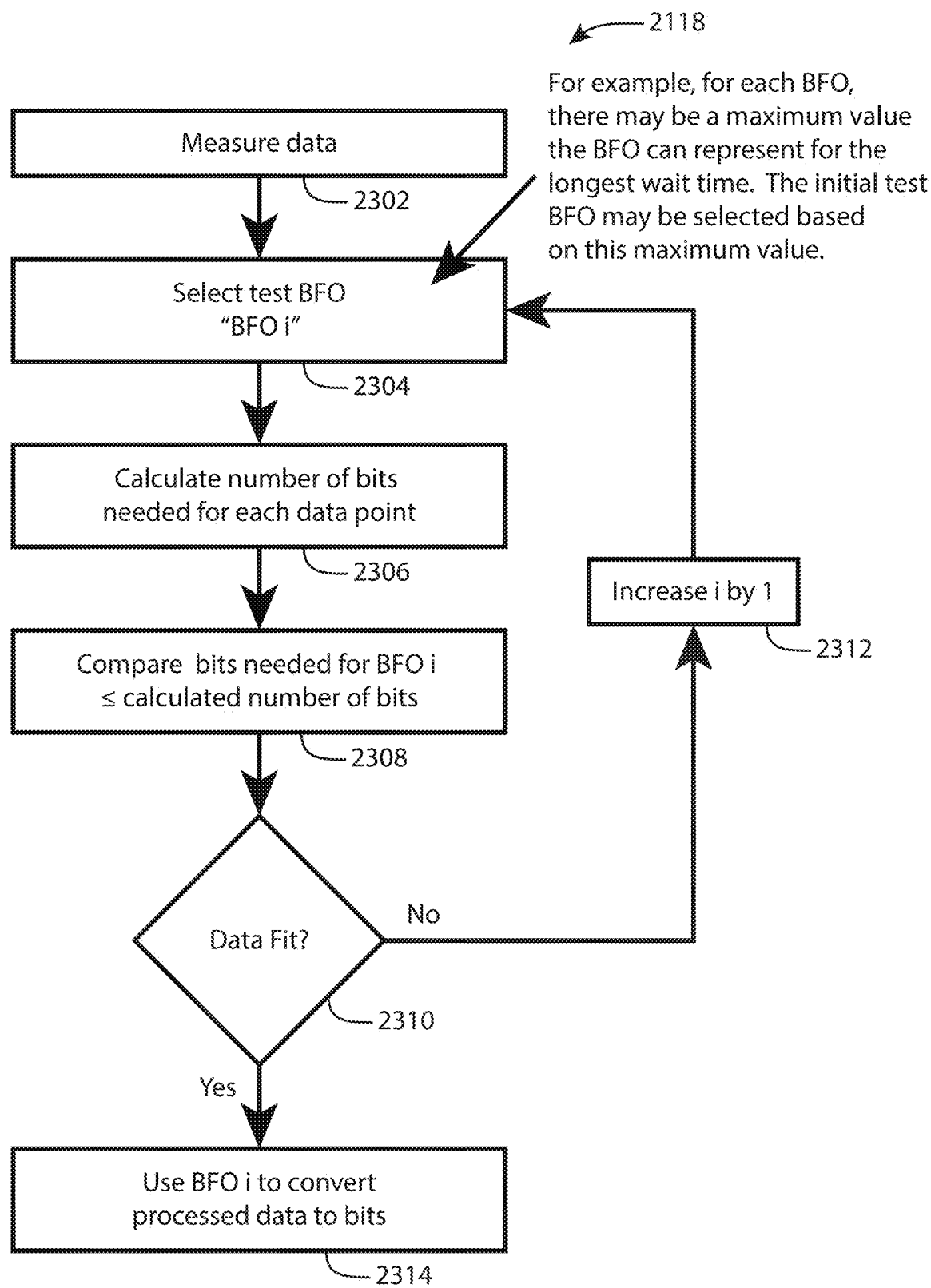
FIG. 23 is a flow chart illustrating selection of a binary formatting option.

FIG. 23 is a workflow for an adaptive technique for selecting a BFO downhole. The selection method is not limited to that presented here, but is a representative method by which a BFO may be selected. The workflow assumes that the BFOST (e.g., one of the BFOSTs shown in Tables 1-5 above or another such table) has been selected (the "selected BFOST") and the BFO is now to be selected. The workflow begins by measuring data (2302). A test BFO, BFO i, is then selected (2304). The initial BFO (or "test BFO") may be selected, for example, according to the maximum value the available options can represent for the longest wait times. For example, if the BFOST of Table 3 is being used and it is known that the maximum value to be represented is 9, then BFO 2 may be selected as the initial binary option, because the range of BFO 2 is 8-15, which includes 9. The number of bits needed for each data point to be sent uphole, e.g., X coefficients, without formatting is then calculated (2308), using, for example, Table 2 which allocates the same number of bits to each bin. The number of bits for BFO i is then compared to the calculated number of bits (2306). If the data fits (2310), i.e., if the number of bits for BFO i is less than or equal to the calculated number of bits ("Yes" branch from (2310)), BFO i is used to convert the processed data to binary. Otherwise if the data does not fit ("No" branch from (2310)), i is increased by 1 (so that "BFO i" is a binary option requiring more bits) and the process returns to (2304). It may be possible to skip (2308) after the first iteration through the loop shown in FIG. 23 if the calculation does not change for each loop. Note that the example just described assumes that the BFOST lists the BFOs in ascending order by the number of bits required. It will be understood that similar processing can be performed with the binary options listed in different order, such as descending order.

Further examples consistent with the present teachings are set out in the following numbered clauses.

Clause 1. A method comprising:
receiving data downhole from a downhole logging tool to produce received data;
processing the received data to produce processed data;
selecting a binary formatting option from a group of binary formatting options, wherein applying the selected binary formatting option to the processed data produces fewer bits than applying any other binary formatting option of the group of binary formatting options to the processed data;
applying the selected binary formatting option to the processed data to produce binary data;
transmitting the binary data uphole;
receiving the binary data uphole;
decompressing the received binary data to produce uncompressed data; and
processing the uncompressed data uphole.

Clause 2. The method of clause 1, wherein processing the uncompressed data includes:
inverting the uncompressed data to produce inverted data; and
transforming the inverted data to produce transformed data.

Clause 3. The method of any preceding clause, wherein:
processing the received data includes scaling before or after compressing.

Clause 4. The method of any preceding clause wherein applying the selected binary formatting option includes including a designator to indicate the identity of the selected binary formatting option to the binary data.

Clause 5. The method of any preceding clause wherein each of the group of binary formatting options specifies a designator field having a designator field number of bits and a plurality of data values, wherein the designator field identifies a number of bits associated with each data value, wherein sums of the designator field number of bits and the number of bits associated with each data value produces a total number of bits for each binary formatting option.

Clause 6. The method of any preceding clause wherein the group of binary formatting options are each arranged with the assumption that processing the received data includes delta compression.

Clause 7. The method of any preceding clause wherein the group of binary formatting options is contained in a binary formatting option selection table and wherein scaling is performed using a scaling table associated with the binary formatting option selection table, wherein the binary formatting option selection table comprises a plurality of data fields and wherein the scaling table includes a scalar counterpart for each of the plurality of data fields, wherein each scalar is selected to scale a maximum value expected for a data field to a maximum number of bits available for that data field.

Clause 8. The method of any preceding clause wherein the group of binary formatting options is contained in a binary formatting option selection table.

Clause 9. The method of clause 8 wherein the binary formatting option selection table is loaded on the downhole logging tool before the downhole logging tool is deployed in a borehole.

Clause 10. A computer program, stored in a non-transitory computer-readable tangible medium, on which is recorded a computer program, the computer program comprising executable instructions, that, when executed, perform a method comprising:
receiving data downhole from a downhole logging tool to produce received data;
processing the received data to produce processed data;
selecting a binary formatting option from a group of binary formatting options, wherein applying the selected binary formatting option to the processed data produces fewer bits than applying any other binary formatting option of the group of binary formatting options to the processed data;
applying the selected binary formatting option to the processed data to produce binary data;
transmitting the binary data uphole;
receiving the binary data uphole;
decompressing the received binary data to produce uncompressed data; and
processing the uncompressed data uphole.

Clause 11. The computer program of clause 10 wherein processing the uncompressed data includes:
inverting the uncompressed data to produce inverted data; and
transforming the inverted data to produce transformed data.

Clause 12. The computer program of clauses 10-11 wherein:
processing the received data includes scaling before or after compressing.

Clause 13. The computer program of clauses 10-12 wherein applying the selected binary formatting option includes including a designator to indicate the identity of the selected binary formatting option to the binary data.

Clause 14. The computer program of clauses 10-13 wherein each of the group of binary formatting options specifies a designator field having a designator field number of bits and a plurality of data values, wherein the designator field identifies a number of bits associated with each data value, wherein sums of the designator field number of bits and the number of bits associated with each data value produces a total number of bits for each binary formatting option.

Clause 15. The computer program of clauses 10-14 wherein the group of binary formatting options are each arranged with the assumption that processing the received data includes delta compression.

Clause 16. The computer program of clauses 10-15 wherein the group of binary formatting options is contained in a binary formatting option selection table and wherein scaling is performed using a scaling table associated with the binary formatting option selection table, wherein the binary formatting option selection table comprises a plurality of data fields and wherein the scaling table includes a scalar counterpart for each of the plurality of data fields, wherein each scalar is selected to scale a maximum value expected for a data field to a maximum number of bits available for that data field.

Clause 17. A system comprising:
a nuclear magnetic resonance (NMR) tool;
a control unit coupled to the NMR tool to control the NMR tool; and
a downhole processor coupled to the NMR tool and the control unit to perform a method comprising:
receiving data downhole from the NMR tool to produce received data;
processing the received data to produce processed data;
selecting a binary formatting option from a group of binary formatting options, wherein applying the selected binary formatting option to the processed data produces fewer bits than applying any other binary formatting option of the group of binary formatting options to the processed data;
applying the selected binary formatting option to the processed data to produce binary data;
transmitting the binary data uphole;
receiving the binary data uphole;
decompressing the received binary data to produce uncompressed data; and processing the uncompressed data uphole.

Clause 18. The system of clause 17 wherein:
processing the received data includes scaling before or after compressing.

Clause 19. The system of clauses 17-18 wherein applying the selected binary formatting option includes including a designator to indicate the identity of the selected binary formatting option to the binary data.

Clause 20. The system of clause 17-19 wherein each of the group of binary formatting options specifies a designator field having a designator field number of bits and a plurality of data values, wherein the designator field identifies a number of bits associated with each data value, wherein sums of the designator field number of bits and the number of bits associated with each data value produces a total number of bits for each binary formatting option.

The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method comprising:
receiving nuclear magnetic resonance (NMR) data downhole from a downhole logging tool to produce received NMR data associated with a subsurface formation;
processing the received NMR data to produce processed NMR data;
compressing the processed NMR data;
selecting a binary formatting option from a group of binary formatting options based on a total porosity value of the subsurface formation;
applying the selected binary formatting option to the processed NMR data to produce binary data;
transmitting the binary data uphole;
receiving the binary data uphole;
decompressing the received binary data to produce uncompressed data; and
processing the uncompressed data uphole.

2. The method of claim 1, wherein processing the uncompressed data includes:
inverting the uncompressed data to produce inverted data; and
transforming the inverted data to produce transformed data.

3. The method of claim 1, wherein:
processing the received NMR data includes scaling before or after compressing.

4. The method of claim 1 wherein applying the selected binary formatting option includes including a designator to indicate the identity of the selected binary formatting option to the binary data.

5. The method of claim 1 wherein each of the group of binary formatting options specifies a designator field having a designator field number of bits and a plurality of data values, wherein the designator field identifies a number of bits associated with each data value, wherein sums of the designator field number of bits and the number of bits associated with each data value produces a total number of bits for each binary formatting option.

6. The method of claim 1 wherein the group of binary formatting options are each arranged with the assumption that processing the received NMR data includes delta compression.

7. The method of claim 1 wherein the group of binary formatting options is contained in a binary formatting option selection table and wherein scaling is performed using a scaling table associated with the binary formatting option selection table, wherein the binary formatting option selection table comprises a plurality of data fields and wherein the scaling table includes a scalar counterpart for each of the plurality of data fields, wherein each scalar is selected to scale a maximum value expected for a data field to a maximum number of bits available for that data field.

8. The method of claim 1 wherein the group of binary formatting options is contained in a binary formatting option selection table.

9. The method of claim 8 wherein the binary formatting option selection table is loaded on the downhole logging tool before the downhole logging tool is deployed in a borehole.

10. A non-transitory machine-readable medium including program code executable on one or more processors, the program code comprising instructions to:
receive nuclear magnetic resonance (NMR) data downhole from a downhole logging tool to produce received data associated with a subsurface formation;
process the received NMR data to produce processed NMR data;
compress the processed NMR data;
select a binary formatting option from a group of binary formatting options based on porosity value of a subsurface formation;
apply the selected binary formatting option to the processed NMR data to produce binary data;
transmit the binary data uphole;
receive the binary data uphole;
decompress the received binary data to produce uncompressed data; and
process the uncompressed data uphole.

11. The non-transitory machine-readable medium of claim 10 wherein processing the uncompressed data further includes instructions to:
invert the uncompressed data to produce inverted data; and
transform the inverted data to produce transformed data.

12. The non-transitory machine-readable medium of claim 10 wherein the instructions to
process the received data include instructions to scale before or after compressing.

13. The non-transitory machine-readable medium of claim 10 wherein the instructions to apply the selected binary formatting option include instructions to include a designator to indicate the identity of the selected binary formatting option to the binary data.

14. The non-transitory machine-readable medium of claim 10 wherein each of the group of binary formatting options to specify a designator field having a designator field number of bits and a plurality of data values, wherein the designator field to identify a number of bits associated with each data value, wherein sums of the designator field number of bits and the number of bits associated with each data value to produce a total number of bits for each binary formatting option.

15. The non-transitory machine-readable medium of claim 10 wherein the group of binary formatting options are each arranged with the assumption that processing the received data includes delta compression.

16. The non-transitory machine-readable medium of claim 10 wherein the group of binary formatting options is contained in a binary formatting option selection table and wherein the instructions to scale include instructions to use a scaling table associated with the binary formatting option selection table, wherein the binary formatting option selection table comprises a plurality of data fields and wherein the scaling table includes a scalar counterpart for each of the plurality of data fields, wherein each scalar is selected to scale a maximum value expected for a data field to a maximum number of bits available for that data field.

17. A system comprising:
a nuclear magnetic resonance (NMR) tool;
a control unit coupled to the NMR tool to control the NMR tool; and
a downhole processor coupled to the NMR tool and the control unit configured to execute program code comprising instructions to:
receive data downhole from the NMR tool to produce received NMR data;
process the received NMR data to produce processed NMR data associated with a subsurface formation;
compress the processed NMR data;
select a binary formatting option from a group of binary formatting options based on a porosity value of the subsurface formation;
apply the selected binary formatting option to the processed data to produce binary data;
transmit the binary data uphole;
receive the binary data uphole;
decompress the received binary data to produce uncompressed data; and
processing the uncompressed data uphole.

18. The system of claim 17 wherein the instructions to process the received data include instructions to scale the received data before or after compressing.

19. The system of claim 17 wherein the instructions to apply the selected binary formatting option include instructions to include a designator to indicate the identity of the selected binary formatting option to the binary data.

20. The system of claim 17 wherein each of the group of binary formatting options specifies a designator field having a designator field number of bits and a plurality of data values, wherein the designator field identifies a number of bits associated with each data value, wherein sums of the designator field number of bits and the number of bits associated with each data value produces a total number of bits for each binary formatting option.

* * * * *